United States Patent
Tsuchiya et al.

(10) Patent No.: US 10,962,391 B2
(45) Date of Patent: Mar. 30, 2021

(54) AIR PHYSICAL QUANTITY SENSOR FOR DETECTING A PHYSICAL QUANTITY OF AIR FLOWING THROUGH A FLOW PASSAGE

(71) Applicant: DENSO CORPORATION, Kariya (JP)

(72) Inventors: Takuma Tsuchiya, Kariya (JP); Junzo Yamaguchi, Kariya (JP); Takashi Enomoto, Kariya (JP); Hiroyuki Akuzawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 163 days.

(21) Appl. No.: 16/267,421

(22) Filed: Feb. 5, 2019

(65) Prior Publication Data

US 2019/0170551 A1   Jun. 6, 2019

Related U.S. Application Data

(63) Continuation of application No. PCT/JP2017/030232, filed on Aug. 24, 2017.

(30) Foreign Application Priority Data

Oct. 28, 2016   (JP) .............................. JP2016-212114

(51) Int. Cl.
| | |
|---|---|
| *G01D 11/24* | (2006.01) |
| *G01F 1/684* | (2006.01) |
| *G01M 15/02* | (2006.01) |
| *G01N 27/22* | (2006.01) |
| *F02D 41/18* | (2006.01) |

(52) U.S. Cl.
CPC ............ *G01D 11/245* (2013.01); *F02D 41/18* (2013.01); *G01F 1/684* (2013.01); *G01M 15/02* (2013.01); *G01N 27/223* (2013.01)

(58) Field of Classification Search
CPC ..... G01D 11/245; G01F 1/684; G01F 1/6842; G01F 1/688; G01F 15/02; G01F 5/00; F02D 41/18; G01M 15/02; G01N 27/223
See application file for complete search history.

(56) References Cited

U.S. PATENT DOCUMENTS

| | | | |
|---|---|---|---|
| 2003/0005782 A1* | 1/2003 | McDonald | .......... G01L 19/0636 |
| | | | 73/866.1 |
| 2007/0139044 A1* | 6/2007 | Lamb | ..................... G01P 1/026 |
| | | | 324/252 |

(Continued)

FOREIGN PATENT DOCUMENTS

| | | |
|---|---|---|
| JP | 2008-241501 | 10/2008 |
| JP | 2016-109625 | 6/2016 |

*Primary Examiner* — Natalie Huls
(74) *Attorney, Agent, or Firm* — Nixon & Vanderhye, P.C.

(57) ABSTRACT

A sensor body contains a sensor element in a body recess opened at a body opening. A sensor substrate has a mounting surface on which a circuit element for processing a detection signal is mounted and holds the sensor body on the mounting surface. A sensor cover has a cover window penetrating between an intake passage and the body opening and covers the sensor body. A sensor filter is interposed between the sensor body and the sensor cover. A potting resin body is cured on the mounting surface so as to seal the circuit element. The sensor cover is embedded in the potting resin body on the outer peripheral side of the sensor body.

12 Claims, 30 Drawing Sheets

(56) References Cited

U.S. PATENT DOCUMENTS

| | | | |
|---|---|---|---|
| 2007/0222005 A1* | 9/2007 | Schmitt | H01L 27/14618 257/414 |
| 2011/0072894 A1 | 3/2011 | Saito et al. | |
| 2012/0018303 A1* | 1/2012 | Bordo | G01N 27/406 204/412 |
| 2012/0198925 A1 | 8/2012 | Saito et al. | |
| 2012/0228756 A1* | 9/2012 | Kolleth | H01L 23/16 257/708 |
| 2013/0145845 A1* | 6/2013 | Enquist | G01D 11/245 73/431 |
| 2013/0269419 A1 | 10/2013 | Etherington et al. | |
| 2015/0143901 A1* | 5/2015 | Matsui | G01L 19/147 73/431 |
| 2015/0260673 A1 | 9/2015 | Seto | |
| 2015/0377671 A1 | 12/2015 | Ooga | |
| 2016/0097661 A1 | 4/2016 | Hidaka et al. | |
| 2017/0122788 A1 | 5/2017 | Kishikawa et al. | |
| 2018/0120248 A1* | 5/2018 | Akuzawa | G01N 27/121 |
| 2020/0045840 A1* | 2/2020 | Kraus | G01D 11/245 |
| 2020/0221591 A1* | 7/2020 | Liskow | H05K 5/0204 |

* cited by examiner

AIR PHYSICAL QUANTITY SENSOR FOR DETECTING A PHYSICAL QUANTITY OF AIR FLOWING THROUGH A FLOW PASSAGE

CROSS REFERENCE TO RELATED APPLICATIONS

The present application is a continuation application of International Patent Application No. PCT/JP2017/030232 filed on Aug. 24, 2017, which designated the U.S. and claims the benefits of priority of Japanese Patent Application No. 2016-212114 on Oct. 28, 2016. The entire disclosure of all of the above applications is incorporated herein by reference.

TECHNICAL FIELD

The present invention relates to an air physical quantity sensor for detecting a specific physical quantity of air flowing through a flow passage.

BACKGROUND

In an air physical quantity sensor, a sensor filter is fixed to a sensor cap having a cap window portion penetrating between the flow passage and the body opening portion. As a result, the sensor filter can suppress the deterioration of the sensor element in the body concave portion due to foreign matter in the air by filtering the air flowing into the body concave portion through the cap window portion and the body opening portion from the flow passage.

SUMMARY

An object of the present disclosure is to provide an air physical quantity sensor that suppresses separation of a sensor filter.

In aspects of the present disclosure, an air physical quantity sensor for detecting a specific physical quantity related to air flowing in a flow passage, includes:

a sensor element configured to output a detection signal in accordance with the specific physical quantity, a sensor body having a body recess in which the sensor element is houses, the body recess opening at a body opening portion, a sensor substrate having a mounting surface on which a circuit element for processing a detection signal is mounted and being configured to hold the sensor body by the mounting surface, a sensor cover having a cover window configured to communicate between the flow passage and the body opening portion, the sensor covering the sensor body, a sensor filter which is interposed between the sensor body and the sensor cover and filters air flowing from the flow passage into the body recess through the cover window and the body opening portion, and a potting resin body which is hardened in a state where the circuit element is sealed on the mounting surface and in which the sensor cover is embedded on an outer peripheral side of the sensor body.

DETAILED DESCRIPTION

Figure 1:
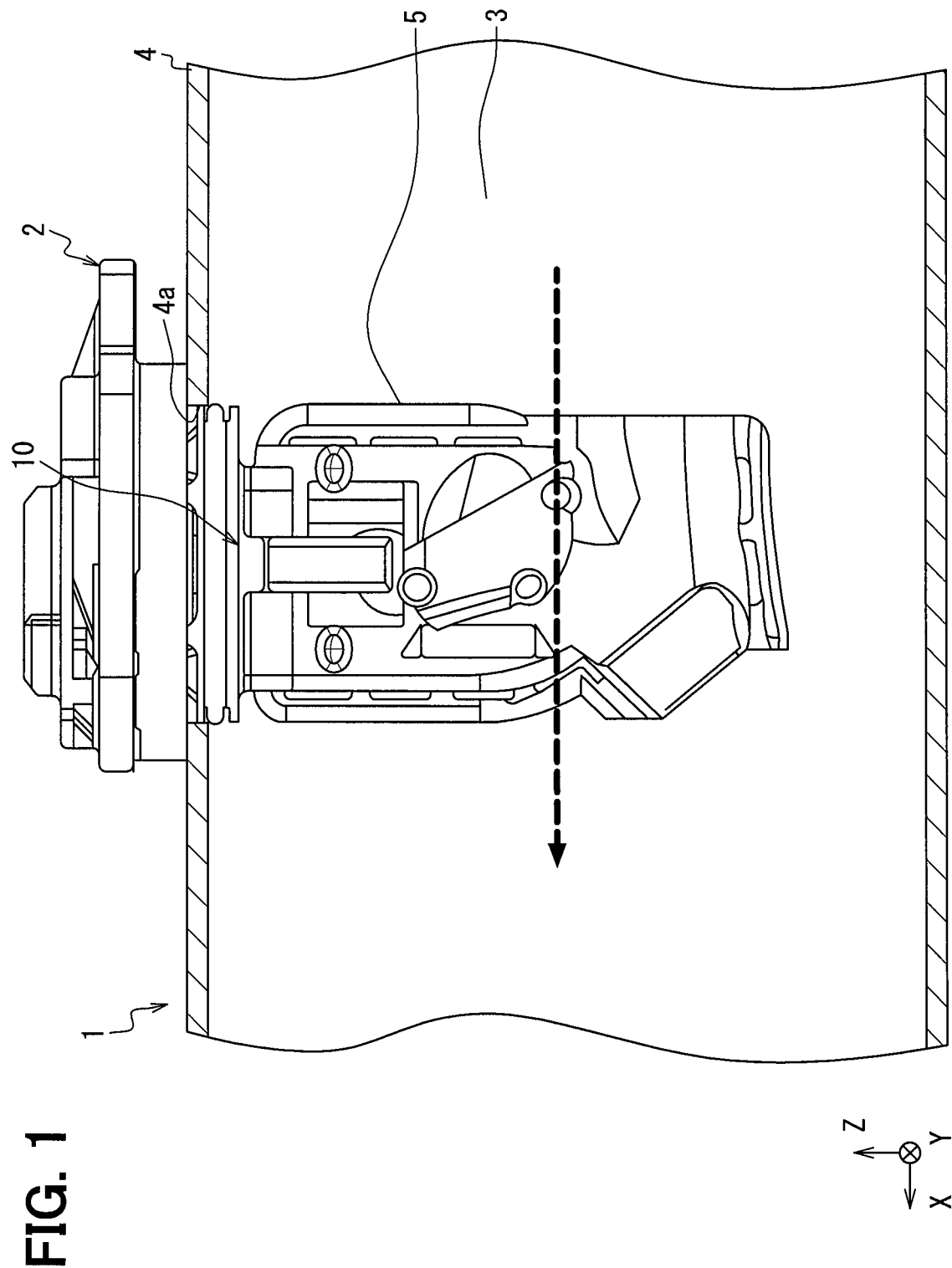
FIG. 1 is a partial cross-sectional view, showing an air physical quantity sensor attached to an air flow detection unit in an internal combustion engine.

In the following, embodiments of the present disclosure are described with reference to the accompanying drawings. In the description and in the drawings, identical or similar components bear the same reference numerals or characters. If a part of the features in each embodiment is explained, the remaining part of the features may apply to the remaining part of the features in other embodiments. In each embodiment, a combination of the features is disclosed in the specification, and in addition to the combination, the features in the embodiments may be combined, even if such combinations are not apparently disclosed in the specification.

First Embodiment

As shown in FIG. 1, an air physical quantity sensor 10 is applied to an air flow detection unit 2 in an internal combustion engine 1.

Figure 2:
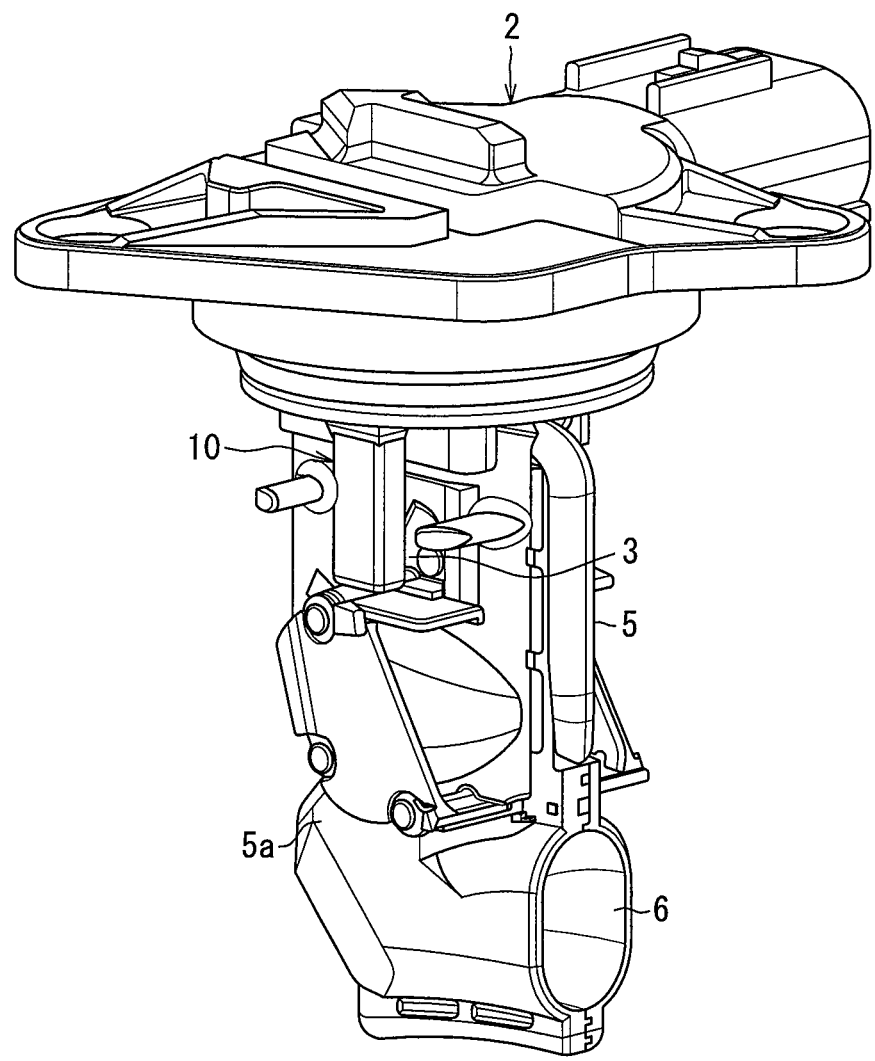
FIG. 2 is a perspective view, showing the air flow detection unit provided with the air physical quantity sensor in a first embodiment.
Figure 3:
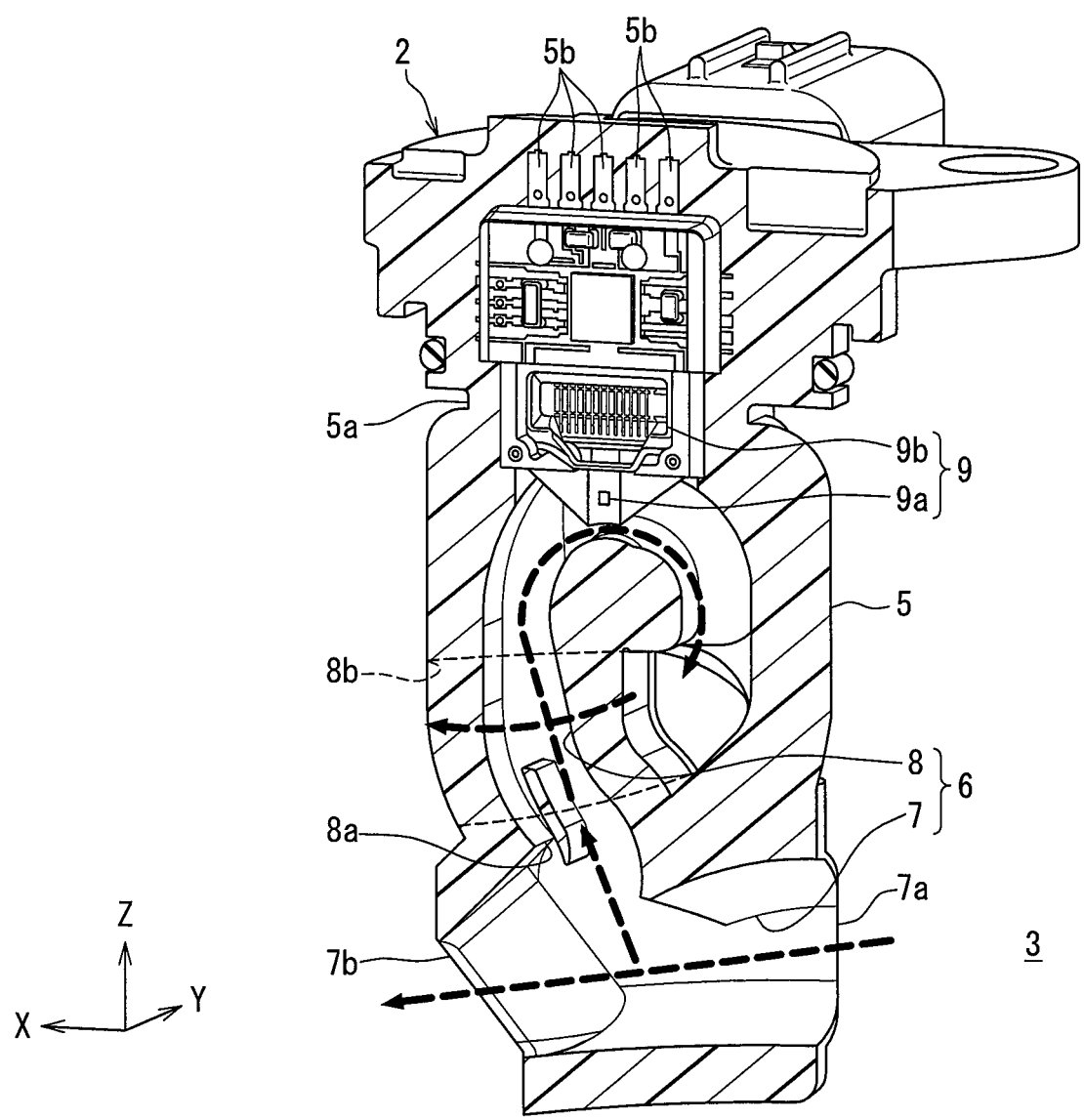
FIG. 3 is a perspective and partial cross-sectional view showing the air flow detection unit in the first embodiment.

The air flow detection unit 2 is attached to an attachment opening 4a of an intake air duct 4 formed as an intake passage 3 in the internal combustion engine 1. The air flow detection unit 2 is provided with a flow detection body 5 located in the intake passage 3. As shown in FIGS. 2 and 3, the flow detection body 5 has a bypass passage 6 in a detection portion 5a. Along an arrow of the broken line shown in FIGS. 1 and 3, a part of the intake air flowing into a cylinder of the internal combustion engine 1 through the intake passage 3 is distributed in the bypass passage 6 from the intake passage 3.

As shown in FIG. 3, the bypass passage 6 comprises a first passage portion 7 and a second passage portion 8. The straight first passage portion 7 includes an inlet 7a and an outlet 7b, both of which open the intake passage 3. In a direction of an arrow of the dashed line shown in FIG. 3, the first passage portion 7 introduces the intake air in a substantially same direction along the intake passage 3 from the inlet 7a to the outlet 7b. The curved second passage portion 8 comprises an inlet 8a facing a middle part of the first passage portion 7, and an outlet 8b facing the intake passage 3, such that the second passage portion 8 is branched from the first passage portion 7. In the direction of the arrow of the dashed line shown in FIG. 3, the second passage portion 8 turns the intake air in an opposite direction with respect to the intake passage 3 and then flows the intake air in a same direction along the intake passage 3 between the inlet 8a and the outlet 8b.

The flow detection body 5 further includes a flow sensor 9 and the above mentioned bypass passage 6. A sensor element 9a of the flow sensor 9 is exposed to the second passage portion 8. The sensor element 9a outputs a flow signal depending on an amount of intake air flowing in the second passage portion 8. The flow sensor 9 includes a circuit module 9b, which calculates the amount of the intake air in the intake passage 3 based on the flow signal outputted from the sensor element 9a. The amount of intake air calculated by the circuit module 9b is transmitted to an engine control unit provided outside of the intake passage 3 via a signal transmission through a plurality of terminals 5b in the flow detection body 5. The flow detection body 5 detects the amount of the intake air flowing in the intake passage 3 by means of the sensor element 9a.

As shown in FIGS. 1 and 2, the air physical quantity sensor 10 is integrally provided with the air flow detection unit 2. The air physical quantity sensor 10 is arranged outside of the bypass passage 6 such that the sensor 10 is exposed to the intake passage 3 referred to as flow passage. The air physical quantity sensor 10 is configured to have a predetermined width extending in the intake air flow direction in the intake passage 3 in the direction of the arrow of the dashed line shown in FIG. 1, and the air physical quantity sensor 10 is configured to be formed as thick belt shape extending in a vertical direction with respect to the intake air flow direction as a whole. X direction is defined as the intake air flow direction in the intake passage 3. Z direction is defined as a longitudinal direction in which the air physical quantity sensor 10 extends in the vertical direction with respect to the flow direction. Y direction is defined as a vertical direction with respect to both X direction and Z direction.

Figure 4:
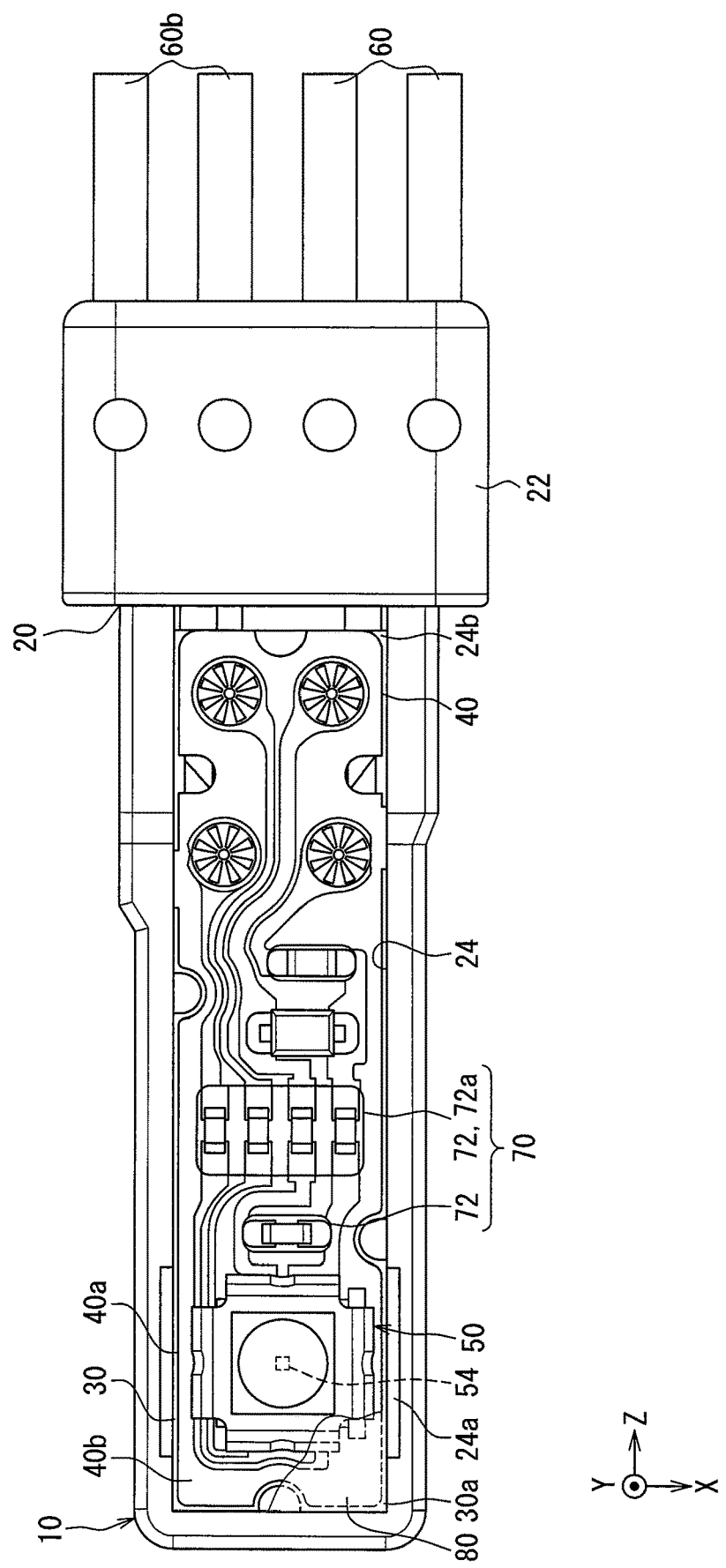
FIG. 4 is a plan view showing an air physical quantity sensor according to a first embodiment.
Figure 5:
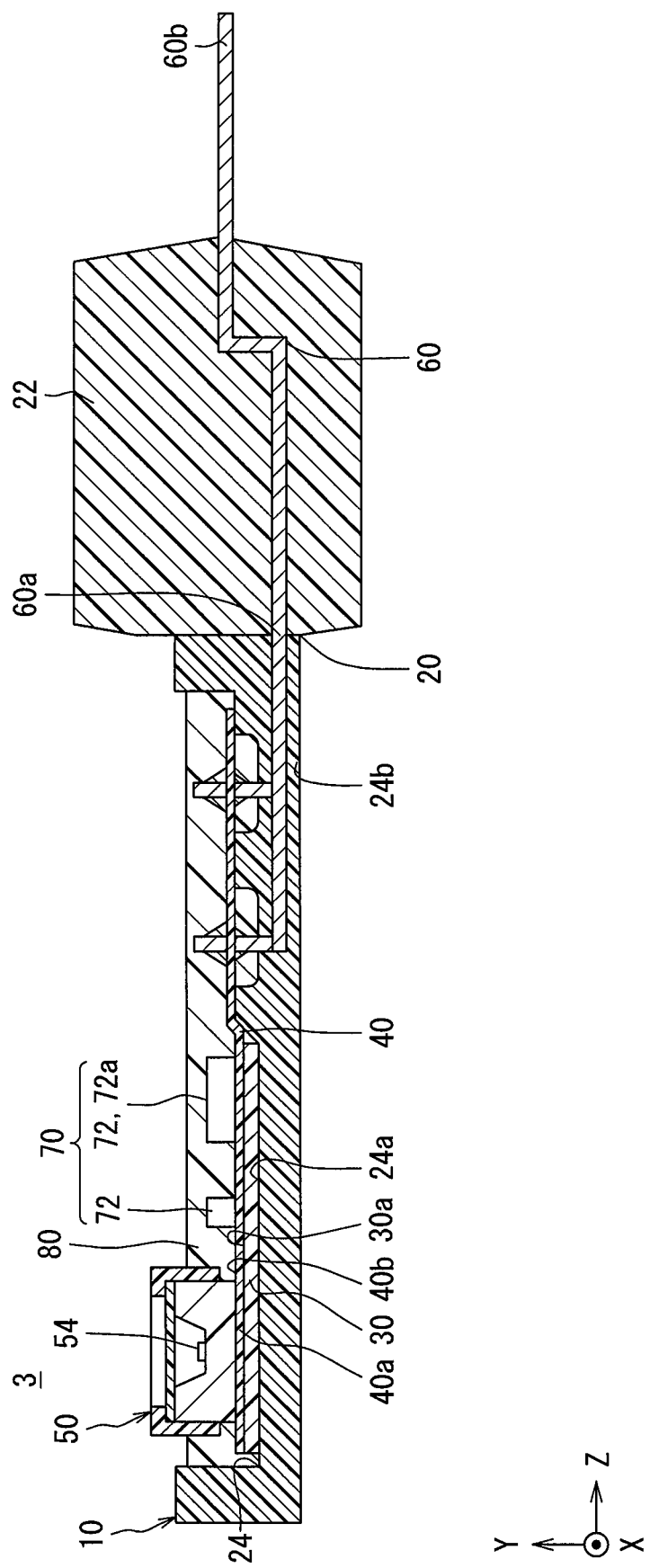
FIG. 5 is a cross-sectional view showing the air physical quantity sensor in the first embodiment.

As shown in FIGS. 4 and 5, the air physical quantity sensor 10 includes a sensor case 20, a reinforced plate 30, a sensor substrate 40, a sensor unit 50, a terminal 60, a circuit module 70, and a potting resin body 80. For ease of understanding of the explanation, in FIG. 4, the potting resin body 80 is shown in a state in which most of the potting resin body 80 is cut.

The sensor case 20 is made of a hard resin, such as polyphenylene sulfide (PPS). The sensor case 20 is formed as thick belt shape, corresponding to a whole contour of the air physical quantity sensor 10. The sensor case 20 has a connector portion 22 and a recess portion 24. The connector portion 22 is provided at one end in Z direction as the longitudinal direction of the sensor case 20. The recess portion 24 is provided on the other end side with respect to one end portion in the Z direction provided with the connector portion 22 in the sensor case 20. The recess portion 24 faces in Y direction toward the flow detection body 5, and the recess portion 24 has a bottomed rectangular shape in planar view in Y direction. After other components 30, 40, 50 and 60 of the air physical quantity sensor 10 are housed in the recess portion 24, the potting resin body 80 is filled into the recess portion 24.

The reinforced plate 30 is made of a metal, such as stainless steel. The reinforced plate 30 is formed as a narrow-width and short thin belt shape in comparison with the sensor case 20. The reinforced plate 30 is positioned and fixed on a bottom surface 24a of the recess portion 24 in a surface contact state. The reinforced plate 30 is embedded by the potting resin body 80 in the recess portion 24.

The sensor substrate 40 is made of a soft resin, such as polyimide, and is called as flexible printed board. The sensor substrate 40 is formed as a narrow-width and short shape in comparison with the sensor case 20, and the sensor substrate 40 is formed as a narrow-width and long thin belt shape in comparison with the reinforced plate 30. The sensor substrate 40 is positioned and fixed on a reinforced surface 30a of the reinforced plate 30 on the opposite side of the bottom surface 24a of the recess portion 24 in a surface contact state. The sensor substrate 40 is embedded by the potting resin body 80 in the recess portion 24, and a part 40a of the sensor substrate 40 in Z direction as a longitudinal direction is reinforced by the reinforced plate 30. The sensor substrate 40 is provided with a mounting surface 40b in a reinforced part 40a, which is formed as a planar surface positioned on the opposite side of the reinforced plate 30.

The sensor unit 50 has a sensor element 54 which detects humidity representing a ratio of water vapor in the intake air. Humidity is referred to as specified physical quantity relating to the intake air flowing in the intake passage 3. The sensor element 54 of the sensor unit 50 outputs a humidity signal, referred to as a detection signal in accordance with the humidity of the intake air as a detecting target. The sensor unit 50 is formed as a rectangular shape as a whole. The sensor unit 50 is mounted on the mounting surface 40b in the reinforced part 40a on the sensor substrate 40. A part of the sensor unit 50 in Y direction is embedded by the potting resin body 80 in the recess portion 24, and a remaining part of the sensor unit 50 in Y direction is exposed to the intake passage 3 positioned outside of the sensor case 20.

A plurality of terminals 60 are provided. Each of the terminals 60 is made of a metal, such as phosphor bronze. Each of the terminals is formed as a narrow-width and short thin belt shape in comparison with the sensor case 20. Each of the terminals 60 is disposed substantially in parallel in X direction each other. A part 60a of each of the terminals 60 in Z direction is embedded in the sensor case 20 toward the connector portion 22 from the bottom wall 24b formed as the bottom surface 24a of the recess portion 24. Other part 60b of each of the terminals 60 in Z direction is protruded toward outside of the sensor case 20 from the connector portion 22. The other part 60b of each of the terminals 60 is electrically connected to the engine control unit via any one of the terminals 5b in the air flow detection unit 2. It is preferable that each of the terminals 60 is formed as thin having a thickness of 0.2 mm (for example), and is functioned as a low thermal conductivity. So, a heat insulating function is obtained between an outside including the engine control unit, and the circuit module 70 and the sensor element 54 such that a detection error due to increasing of a temperature of the sensor element 54 can be suppressed.

The circuit module 70 is electrically connected to the sensor element 54 and each of the terminals 60 through a metal conductor provided on the sensor substrate 40. The circuit module 70 includes a plurality of circuit elements 72 for processing a humidity signal outputted from the sensor element 54. Each of the circuit elements 72 is mounted on the mounting surface 40b in the reinforced part 40a on the sensor substrate 40. A control circuit 72a in the circuit elements 72 calculates the humidity of the intake air in the intake passage 3 based on the humidity signal. The humidity calculated by the control circuit 72a is transmitted to the engine control unit by means of the signal through each of the terminals 60.

The potting resin body 80 is made of a hard thermoset resin, such as an epoxy resin or a polyurethane, etc. The potting resin body 80 covers almost of the recess portion 24. So, the potting resin body 80 covers the mounting surface 40b such that all circuit elements 72 on the mounting surface 40b are sealed. An electrical short between the circuit elements 72 and a damage of the circuit elements 72 are suppressed because the circuit elements 72 are sealed.

(Sensor Unit)

The sensor unit 50 is explained in detail below.

Figure 6:
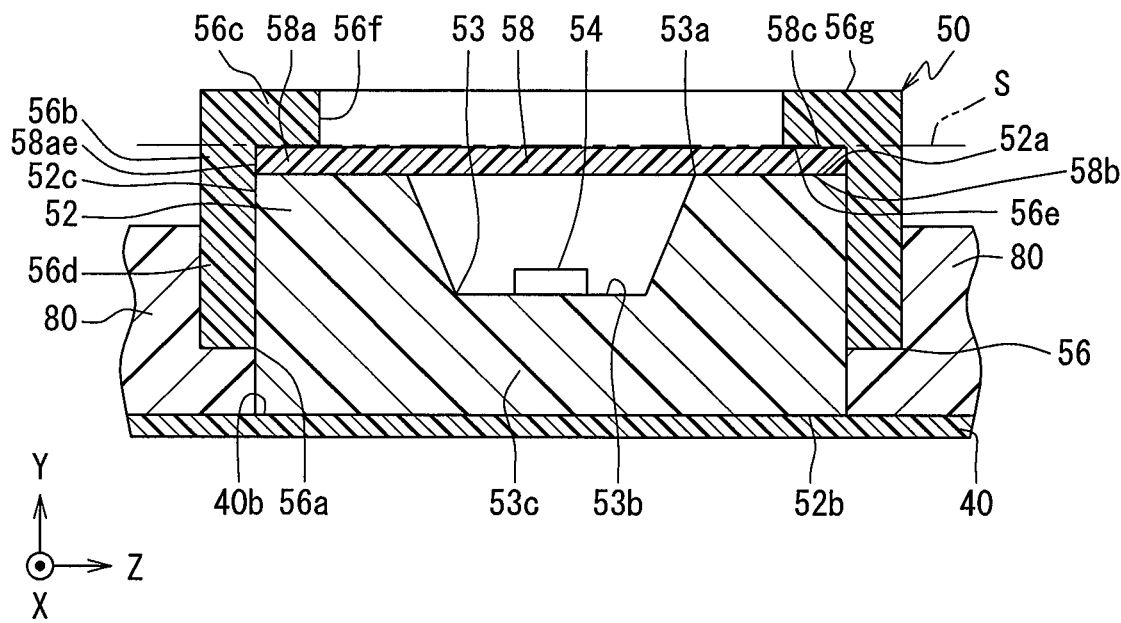
FIG. 6 is a cross-sectional view showing the sensor unit in the first embodiment.
Figure 7:
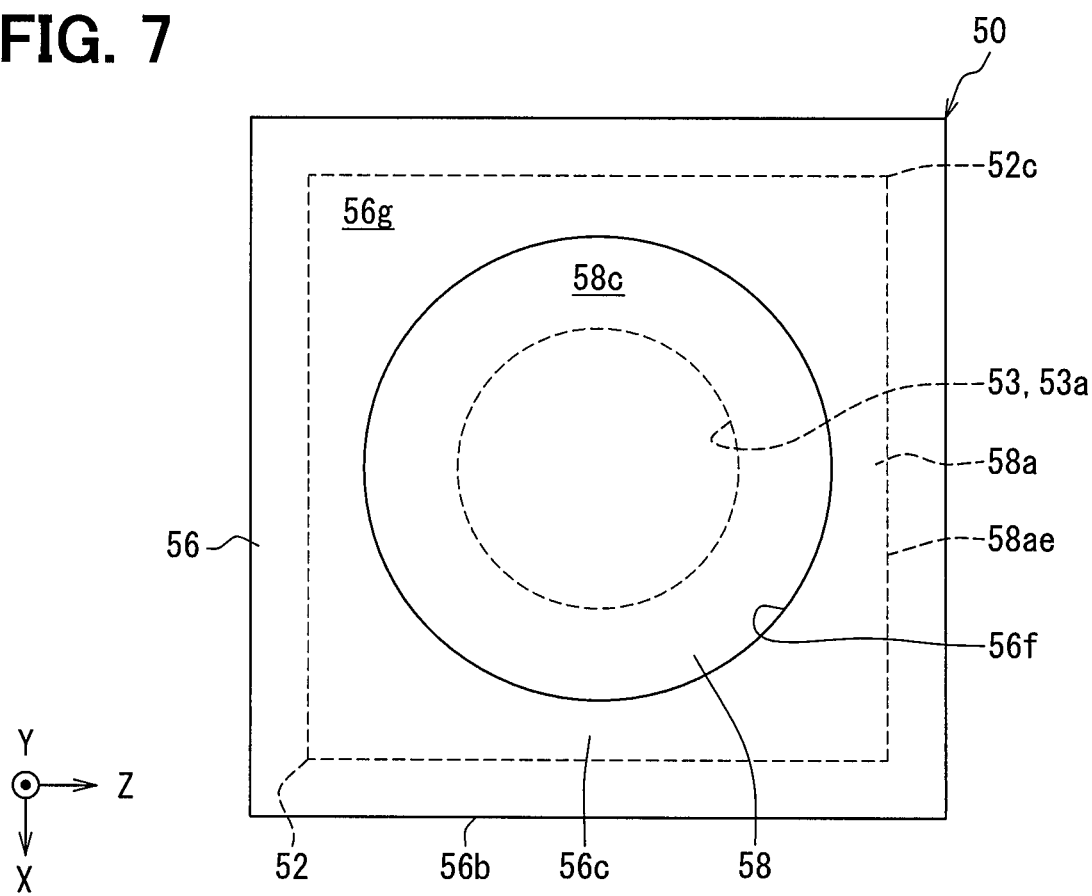
FIG. 7 is a plan view showing the sensor unit in the first embodiment.

As shown in FIGS. 6 and 7, the sensor unit 50 has a sensor body 52, a sensor element 54, a sensor cover 56, and a sensor filter 58.

The sensor body 52 according to FIG. 6 is formed of a thermoset resin, such as an epoxy resin, etc. The sensor body 52 is formed as a rectangular shape having 6 (six) surfaces along each direction of X, Y and Z directions. One surface 52b of the sensor body 52 is positioned and fixed on the mounting surface 40b of the sensor substrate 40 in a surface contact state such that the sensor body 52 is held on the mounting surface 40b.

The sensor body 52 has a body recess 53. As shown in FIGS. 6 and 7, the body recess 53 is provided at a central portion in X and Z directions in the sensor body 52. The body recess 53 opens in the opposite side of the sensor substrate 40 in Y direction, and is formed as a circle bottomed hole in planar view in Y direction. The body recess 53 is formed in the opposite surface 52a of the sensor body 52 with respect to the mounting surface 40b, and opens at a body opening portion 53a. The body recess 53 according to the first embodiment is formed as a truncated cone hole shape such that a diameter becomes gradually larger toward the body opening portion 53a from a bottom surface 53b.

As shown in FIG. 6, the sensor element 54 senses the humidity of the intake air based on a change of a dielectric constant in a polymer film due to a predetermined correlation with respect to the humidity change of the intake air flowing in the intake passage 3. The sensor element 54 is positioned and fixed on the bottom surface 53b separated from the body opening portion 53a, and the sensor element 54 is housed in the body recess 53. The sensor element 54 is electrically connected to a metal conductor on the sensor substrate 40 through a metal conductor (not shown) which is embedded on a bottom wall 53c forming as the bottom surface 53b of the body recess 53 in the sensor body 52. So, the sensor element 54 is configured to output a humidity signal, which varies electrically based on the sensed humidity to the circuit module 70 according to FIGS. 4 and 5.

As shown in FIG. 6, the sensor cover 56 is made of a hard resin, such as PPS or polybutylene terephthalate (PBT), in order to minimize a difference in thermal expansion coefficients with respect to at least the sensor case 20 and the potting resin body 80. As shown in FIGS. 6 and 7, the sensor cover 56 opens in a side of the sensor substrate 40 in Y direction, and is formed as a bottomed rectangular shape in planar view in Y direction. The sensor cover 56 includes a cover peripheral wall portion 56b formed as a rectangular tube shape opening at an body opening portion 56a, and a bottom wall portion 56c formed as a rectangular plate shape closing the cover peripheral wall portion 56b in an opposite side of the body opening portion 56a in Y direction. The cover peripheral wall portion 56b and the bottom wall portion 56c are integrally formed.

An inner surface of the cover peripheral wall portion 56b is fitted to the sensor body 52 along Y direction. The cover peripheral wall portion 56b surrounds total outer surface of the sensor body 52. As shown in FIG. 6, the cover peripheral wall portion 56b has the body opening portion 56a in an opposite side of the bottom wall portion 56c in Y direction. A part 56d of the cover peripheral wall portion 56b extending from the body opening portion 56a to the bottom wall portion 56c is positioned and fixed in the potting resin body 80. The cover peripheral wall portion 56b is provided with an embedded portion 56d, which is embedded outside of the sensor body 52 from the body opening portion 56a by the potting resin body 80.

Figure 8:
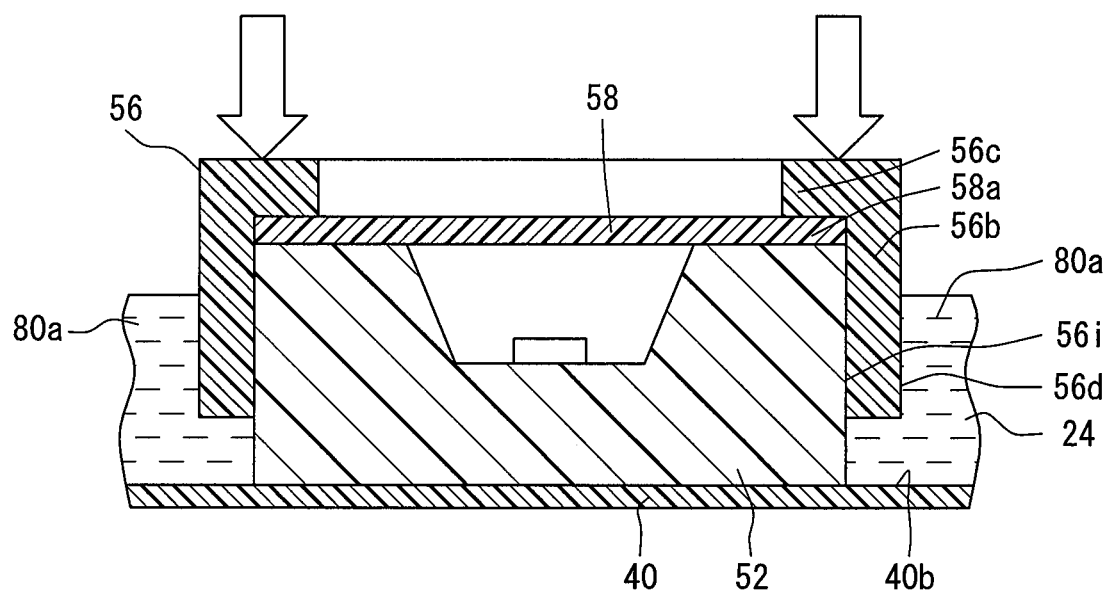
FIG. 8 is a schematic diagram showing a method for manufacturing the sensor unit in the first embodiment.

In order to manufacture the sensor unit 50, as shown in FIG. 8, when the sensor cover 56 is embedded and fixed in the potting resin body 80, a thermosetting resin 80a as a forming material of the potting resin body 80 fills into the recess portion 24 in a melting state and is cooled thereafter. At this time, in order to suppress the floating of the sensor cover 56 caused by the internal pressure of the injected thermosetting resin 80a and to continue to immerse the entire area of the embedded portion 56d in the thermosetting resin 80a, the load directed toward the bottom surface 24a side of the recess portion 24 is continuously acted on the sensor cover 56 as indicated by outlined arrows in FIG. 8. The thermosetting resin 80a is cured on the mounting surface 40b of the sensor substrate 40, and the embedded portion 56d of the cover peripheral wall portion 56b is embedded and fixed in the potting resin body 80.

Since the thermosetting resin 80a heat-shrinks by cooling and curing, a fixing strength of the cover peripheral wall portion 56b by the potting resin body 80 can be enhanced. Since the thermosetting resin 80a is entered into a fitting clearance 56i between the sensor body 52 and the cover peripheral wall portion 56b from the body opening portion 56a, and is cooled and cued thereafter, the fixing strength of the cover peripheral wall portion 56b by the potting resin body 80 can be further enhanced. The embedded portion 56d is embedded and fixed in the potting resin body 80 by cooling and curing of the thermosetting resin 80a, and a filter peripheral portion 58a of the sensor filter 58 (later explained) is held between the sensor body 52 and the bottom wall portion 56c.

As shown in FIGS. 6 and 7, the bottom wall portion 56c is continuously formed substantially vertical to the cover peripheral wall portion 56b at an opposite side of the body opening portion 56a in Y direction. The cover peripheral wall portion 56b fits outside of the sensor body 52, and the bottom wall portion 56c is embedded in the potting resin body 80. The bottom wall portion 56c covers the sensor body 52 from the opposite side of the sensor substrate 40 in Y direction. A part of the intake passage 3 is formed between an outer surface 56g in the opposite side of the bottom wall portion 56c with respect to the sensor body 52 and the detection portion 5a of the flow detection body 5 according to FIG. 2. As shown in FIG. 6, the outer surface 56g of the bottom wall portion 56c exposes the intake passage 3. An inner surface 56e of the bottom wall portion 56c in the opposite side of the outer surface 56g is separated in Y direction from an opposite surface 52a opposite to the mounting surface 40b with respect to the sensor body 52.

As shown in FIGS. 6 and 7, a cover window 56f is formed as penetrating the bottom wall portion 56c at a central portion in X and Z directions. The cover window 56f faces the intake passage 3 and is separated from the body opening portion 53a. The cover window 56f is provided between the intake passage 3 and the body opening portion 53a, and penetrates the bottom wall portion 56c in Y direction. The cover window 56f is formed as a circle penetrating hole shape (cylindrical hole shape) in planar view in Y direction.

As shown in FIG. 6, the sensor filter 58 is made of a soft resin, such as Polytetrafluoroethylene (PTFE) and is formed as a porous shape. The sensor filter 58 made of PTFE is excellent in a chemical resistance and a heat resistance such that the sensor filter in a hot intake passage 3, in which the intake air including oil flows, hardly deteriorates. Furthermore, a deterioration of a filtering performance is minimized, because a water drop and an oil in the intake air hardly spread in an inside of the sensor filter 58.

As shown in FIGS. 6 and 7, the sensor filter 58 is formed as a flat membrane shape, which is spread along a virtual plane S extending virtually in X and Y directions, and is provided with the filter peripheral portion 58a. The filter peripheral portion 58a has a rectangular contour 58ae in planar view in Y direction such that the filter peripheral portion 58a is surrounded by the cover peripheral wall portion 56b from outside of the filter peripheral portion 58a. In the embodiment according to FIGS. 6 and 7, a size of the contour 58ae of the filter peripheral portion 58a is substantially equal to that of an outer contour 52c of the sensor body 52. Within a range satisfied with a formula 1 (later explained), the size of the contour 58ae of the filter peripheral portion 58a may be smaller than that of an outer contour 52c of the sensor body 52.

As shown in FIG. 6, one surface 58b of the filter peripheral portion 58a in Y direction comes into surface contact to the opposite surface 52a of the sensor body 52 with respect to the mounting surface 40b in a non-joining state. An opposite side surface 58c in the Y direction in the filter peripheral portion 58a is in surface contact with the inner surface 56e of the cover bottom wall portion 56c in a non-joining state. The filter peripheral portion 58a comes into surface contact to both the sensor body 52 and the bottom wall portion 56c such that the filter peripheral portion 58a is held between the sensor body 52 and the bottom wall portion 56c. In an inner peripheral side positioned inwardly with respect to a holding portion in the sensor filter 58, one surface 58b faces the intake passage 3 through the cover window 56f, and the opposite surface 58c faces the body opening portion 53a in Y direction.

A slight deformation of the sensor filter 58 held between the sensor body 52 and the bottom wall portion 56c may be occurred due to a microscopically roughness of each of the sensor body 52 and the bottom wall portion 56c contacting the filter peripheral portion 58a. A specification (for example, dimension and material) for the sensor filter 58, the sensor body 52, and the bottom wall portion 56c, is determined in such a manner that the slight deformation is targeted within a permissible range, not hindering a filtering performance of the sensor filter 58.

Figure 9:
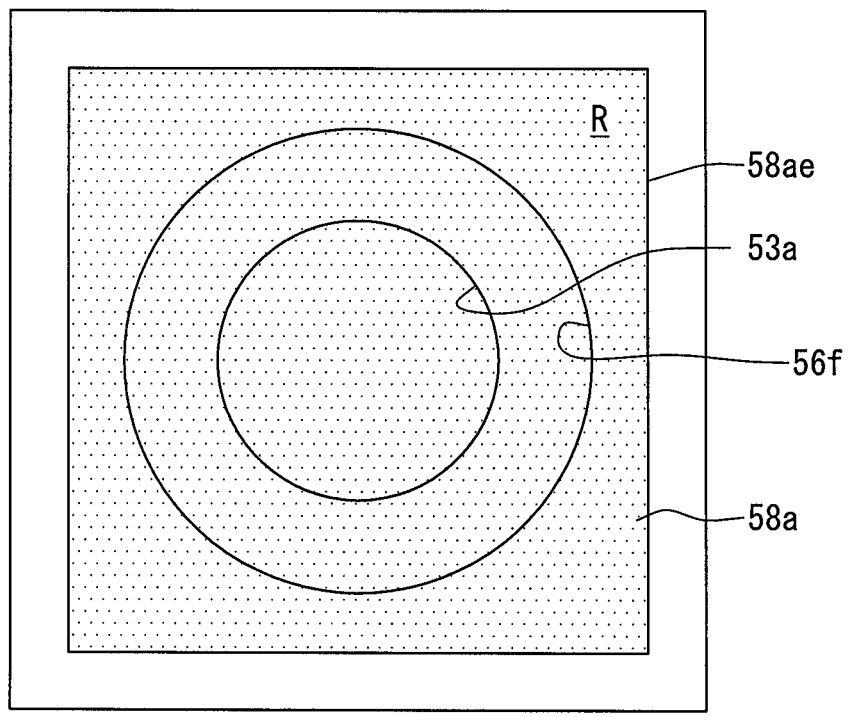
FIG. 9 is a schematic diagram showing a detailed configuration of the sensor unit in the first embodiment.

An area in an inner peripheral side positioned inwardly with respect to the contour 58ae of the filter peripheral portion 58a in the projection view in Y direction with respect to the virtual plane S is defined as a filtering area R partitioned by dots hatching area in FIG. 9. Under such definition, in the projection view (namely, a projection view in FIG. 9) in Y direction with respect to the virtual plane S, the cover window 56f and the body opening portion 53a are positioned in the filtering area R. In the projection view in Y direction with respect to the virtual plane S, the opening portion 53a is positioned in the contour of the cover window 56f within the filtering area R.

Figure 10:
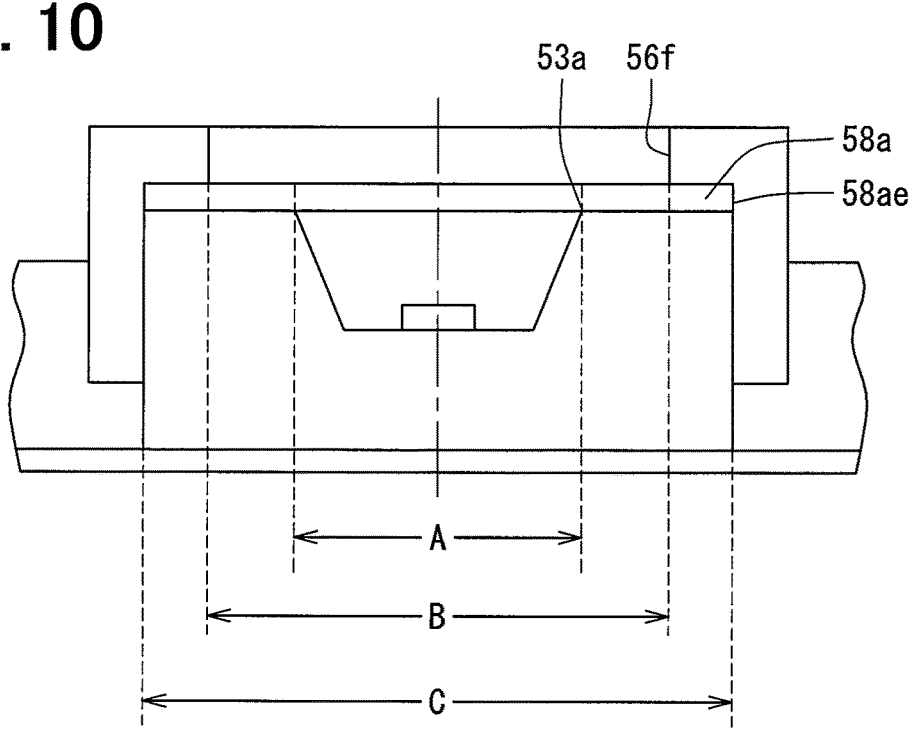
FIG. 10 is a schematic diagram showing a detailed configuration of the sensor unit in the first embodiment.

According to the first embodiment, in which an arrangement of each component is explained by utilizing the projection view, the body opening portion 53a as a circle contour shape, the cover window 56f, and a rectangular contour 58ae as the filtering area R are arranged in such a manner that each center of the body opening portion 53a, the cover window 56f, and the rectangular contour 58ae is substantially aligned, as shown in FIG. 10. In the first embodiment, the diameter A of the circle contour of the body opening portion 53a, the diameter B of the circle contour of the cover window 56f, and the minimum distance C (minimum distance in the radial direction) of the rectangular contour 58ae of the filter peripheral portion 58a in the filtering area R satisfy the following formula 1, as shown in FIG. 10.

$$A<B<C \qquad \text{(Formula 1)}$$

Figure 11:
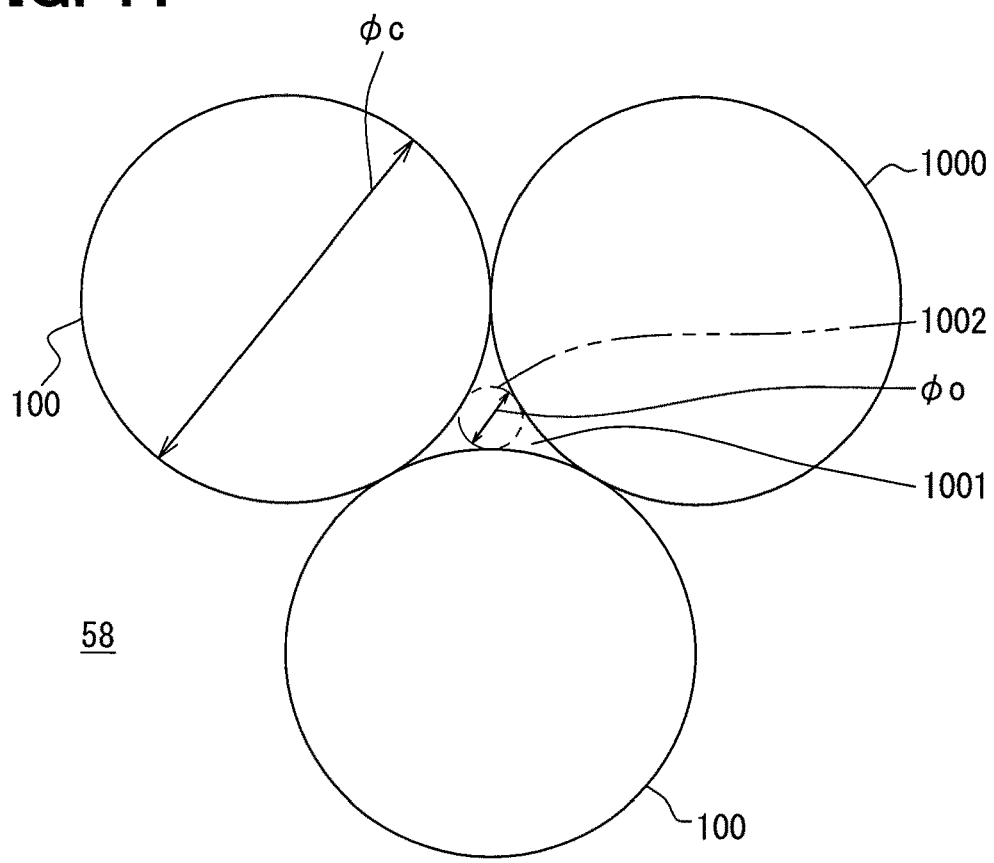
FIG. 11 is a schematic diagram showing a detailed configuration of a sensor filter in the first embodiment.

The sensor filter 58 filters the intake air flowing into the body recess 53 through the cover window 56f and the body opening portion 53a from the intake passage 3. A filtering performance of the sensor filter 58 can be achieved. When the filtering performance is determined, a presumption in which a carbon 1000, which is a foreign particle in the intake air and has a minimum diameter among the foreign particles, is adhered on the sensor filter 58 and arranged to contact each other on the sensor filter 58 only with a gap 1001, is considered, as shown in FIG. 11. In such presumption, if for example the minimum diameter (pc of each carbon 1000 is about 0.03 μm, in the gap 1001 the maximum diameter of an inscribed circle 1002 inside three carbons 1000 is about 0.0046 μm. This figure 0.0046 μm is larger than 0.0004 μm, which designates a minimum diameter of a gap for passing the water vapor in the intake air for the humidity detection. A mesh (namely, gap size for passing the water vapor) of the sensor filter 58 for determining the filter performance is set to between for example 0.001-0.003 μm such that the water vapor in the intake air can be passed through the gap 1001 and through the sensor filter 58. In consideration with the mesh, the thickness between both of the surfaces 58b, 58c of the sensor filter 58 is set to for example, about 0.1 mm.

Effects

The effects of the first embodiment explained so far will be described below.

According to the first embodiment, the sensor filter 58 is interposed between the sensor body 52 and the sensor cover 56. According to this configuration, it is possible to suppress a situation in which the sensor filter 58 is separated from the regular position between the sensor body 52 and the sensor cover 56. Furthermore, the sensor cover 56 is embedded in the potting resin body 80 for sealing the circuit element 72 on the mounting surface 40b of the sensor substrate 40 holding the sensor body 52, on the outer peripheral side of the sensor body 52. As a result, the sensor cover 56 can be fixed in position relative to the sensor substrate 40 with a large embedded surface area that can be secured by hardening the potting resin body 80 and secured on the outer peripheral side of the sensor body 52. It is possible to suppress a situation in which the sensor filter 58 is separated from the regular position to the intake passage 3 by the sensor cover 56 fixed in position. Since the sensor cover 56 is fixed in position by using the potting resin body 80 for sealing the circuit element 72, a special process such as adhesion or welding for fixing the sensor cover 56 to the sensor substrate 40 or the sensor case 20 can be omitted.

Furthermore, according to the first embodiment, the sensor cover 56 having the bottomed cup shape is configured such that the sensor filter 58 held between the bottom wall portion 56c of the sensor cover 56 and the sensor body 52 is surrounded from the outer peripheral side by the cover peripheral wall portion 56b of the sensor cover 58. It is possible to prevent the sensor filter 58 from being separated from the regular position between the sensor body 52 and the cover bottom wall portion 56c into the intake passage 3, in a state where the sensor filter 58 is held and surrounded by the sensor cover 56. Further, in the sensor cover 56 having the bottomed cup shape, since the cover peripheral wall portion 56b surrounding the sensor body 52 from the outer peripheral side is embedded in the potting resin body 80, the embedded surface area secured on the outer peripheral side can be extended to the range of the axial direction length of the cover peripheral wall portion 56b. Therefore, it is possible to reliably suppress the detachment of the sensor filter 58 from the regular position to the intake passage 3 by means of the cover peripheral wall portion 56b of the sensor cover 56 fixed in position with respect to the sensor substrate 40.

According to the first embodiment, in the sensor cover 56 having a bottomed cup shape, the entire outer peripheral side of the sensor body 52 is covered with the cover peripheral wall portion 56b. According to this configuration, it is possible to reliably prevent foreign matter passing from between the sensor body 52 and the cover peripheral wall portion 56b to between the sensor body 52 and the cover bottom wall portion 56c from entering into the body recess 53, so that the deterioration of the sensor element 54 due to the foreign matter can be suppressed.

In the first embodiment, the sensor body 52 having the body recess 53 opened at the body opening portion 53a is covered by the sensor cover 56 having the cover window 56f communicating between the intake passage 3 and the body opening portion 53a. With such a configuration, in the projection view with respect to the virtual plane S, the body opening portion 53a and the cover window 56f are formed in the filter region R on the inner peripheral side of the contour 58ae of the filter peripheral portion 58a formed by the sensor filter 58 spreading along the virtual plane S. As a result, the sensor filter 58 is interposed between the sensor body 52 and the sensor cover 56 at the filter outer peripheral portion 58 in such projection view, so that the separation of the sensor filter 58 from between the sensor body 52 and the sensor cover 56 can be reliably suppressed.

According to the first embodiment, in the projection view with respect to the virtual plane S, the body opening portion 53a is contained within the cover window 56f in the filter region R. The air passing through the cover window 56f and the sensor filter 58 from the intake passage 3 is not blocked by the sensor body 52 around the body opening portion 53a but flows from the body opening portion 53a into the body recess 53. Therefore, the air from the intake passage 3 easily reaches the sensor element 54 in the body recess 53. Here, the sensor filter 58 along the virtual plane S between the sensor body 52 and the sensor cover 56 comes as close as possible to the sensor element 54 in the body recess 53. As a result, the internal volume of the body recess 53 decreases, so that the arrival time of air from the intake passage 3 to the sensor element 54 can be shortened. Therefore, according to these reachability and shortening of arrival time, the detection response by the sensor element 54 can be enhanced.

According to the first embodiment, the air containing the foreign matter in the intake passage 3 of the internal combustion engine 1 is filtered by the sensor filter 58, which is prevented from being separated, before entering into the body recess 53. This makes it possible to prevent the sensor element 54 in the body recess 53 from being deteriorated by foreign matter and to prevent the detached sensor filter 58 from being sucked into the cylinder on the downstream side from the intake passage 3.

Second Embodiment

The second embodiment is a modified example of the first embodiment.

Figure 12:
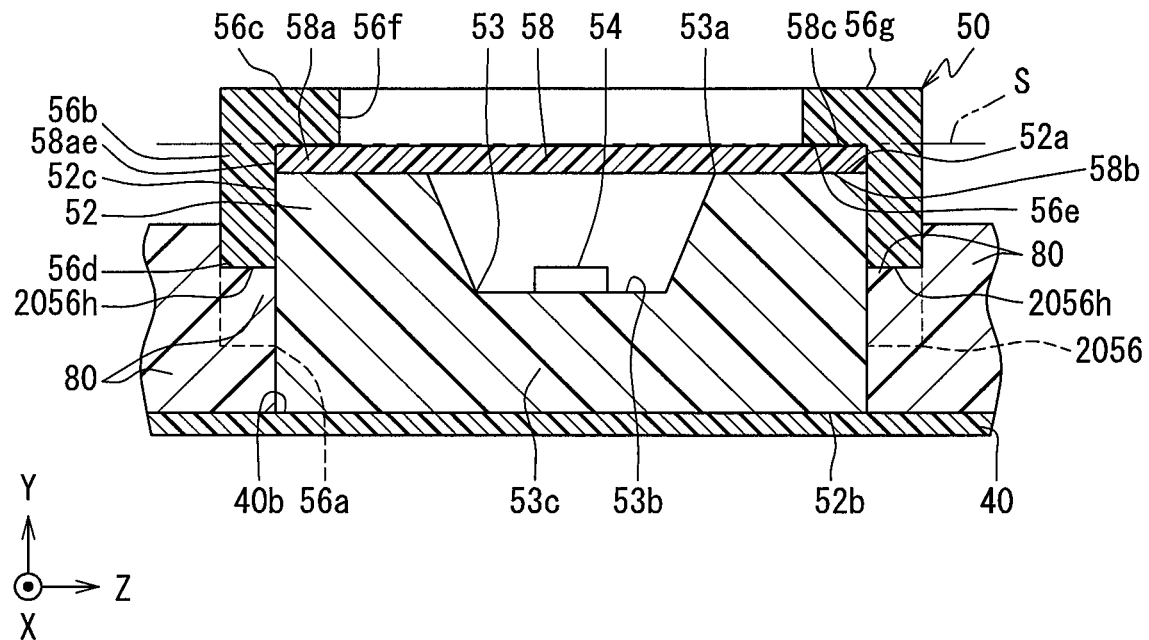
FIG. 12 is a cross-sectional view showing a sensor unit in a second embodiment.
Figure 13:
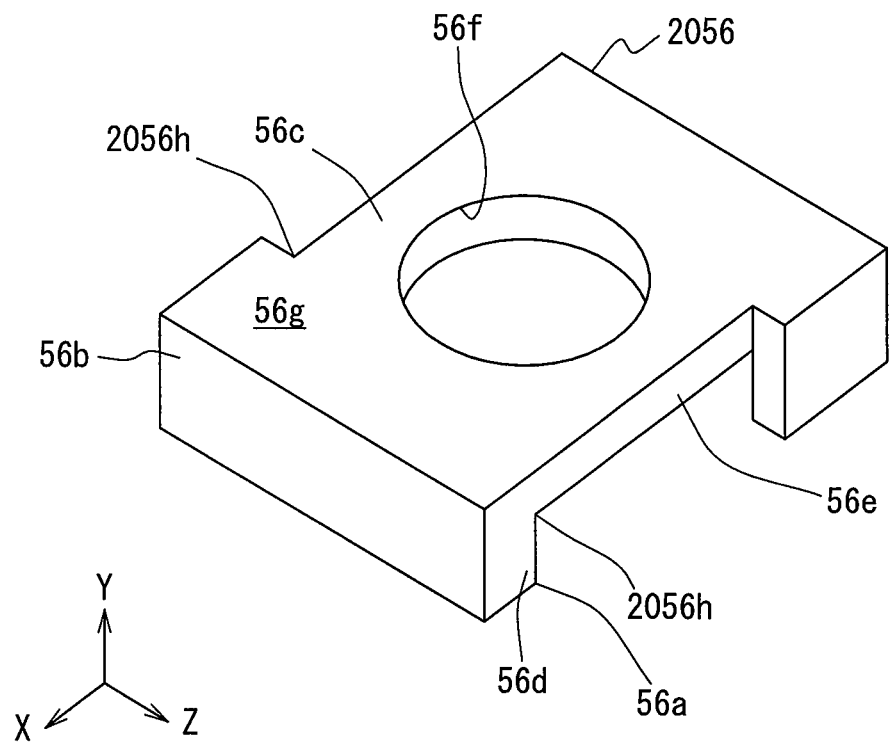
FIG. 13 is a perspective view showing the sensor unit in the second embodiment.

As shown in FIGS. 12 and 13, the sensor cover 2056 having a bottomed cup shape according to the second embodiment has a through hole portion 2056h in the cover peripheral wall portion 56b. One through hole portion 2056h is provided in each of the two opposed walls of the rectangular tubular four walls in the cover peripheral wall portion 56b. Each through hole portion 2056h penetrates the embedded portion 56d of the cover peripheral wall portion 56b embedded in the potting resin body 80 in the Z direction. Here, in particular, each through hole portion 2056h in the second embodiment opens an end portion of the cover opening portion 56a side constituting the embedded portion 56d of the cover peripheral wall portion 56b, and communicates with the cover opening portion 56a.

Figure 14:
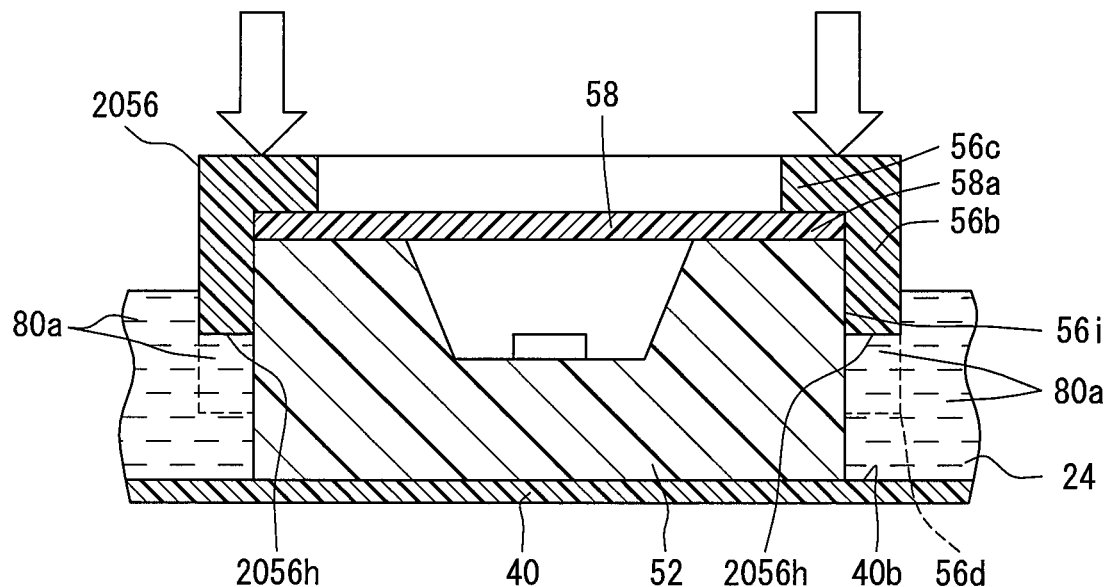
FIG. 14 is a schematic view for explaining a method of manufacturing a sensor unit according to a second embodiment.

As shown in FIG. 14, in the second embodiment, the thermosetting resin 80a, which is a material for forming the potting resin body 80, is filled in each through hole portion 2056h in a hot melted state, and then it enters into a fitting clearance 56i between the sensor body 52 and the cover peripheral wall portion 56b and is cooled and hardened. As a result, as shown in FIG. 12, the potting resin body 80 fills the inside of each through hole portion 2056h and is provided along the fitting clearance 56i between the sensor body 52 and the cover peripheral wall portion 56b from each of the through hole portion 2056h.

As described above, in the sensor cover 2056 having a bottomed cup shape according to the second embodiment, the potting resin body 80 is provided from the through hole portion 2056h penetrating the cover peripheral wall portion 56b along the clearance between the sensor body 52 and the cover peripheral wall portion 56b. As a result, in the sensor cover 2056, the surface area between the sensor body 52 and the cover peripheral wall portion 56b can be added to the embedded surface area that can be secured on the outer peripheral side of the sensor body 52. Therefore, the effect of suppressing the separation of the sensor filter 58 from the regular position to the intake passage 3 can be enhanced by effectively utilizing the cover peripheral wall portion 56b of the sensor cover 2056 fixed in position with respect to the sensor substrate 40.

Third Embodiment

Figure 15:
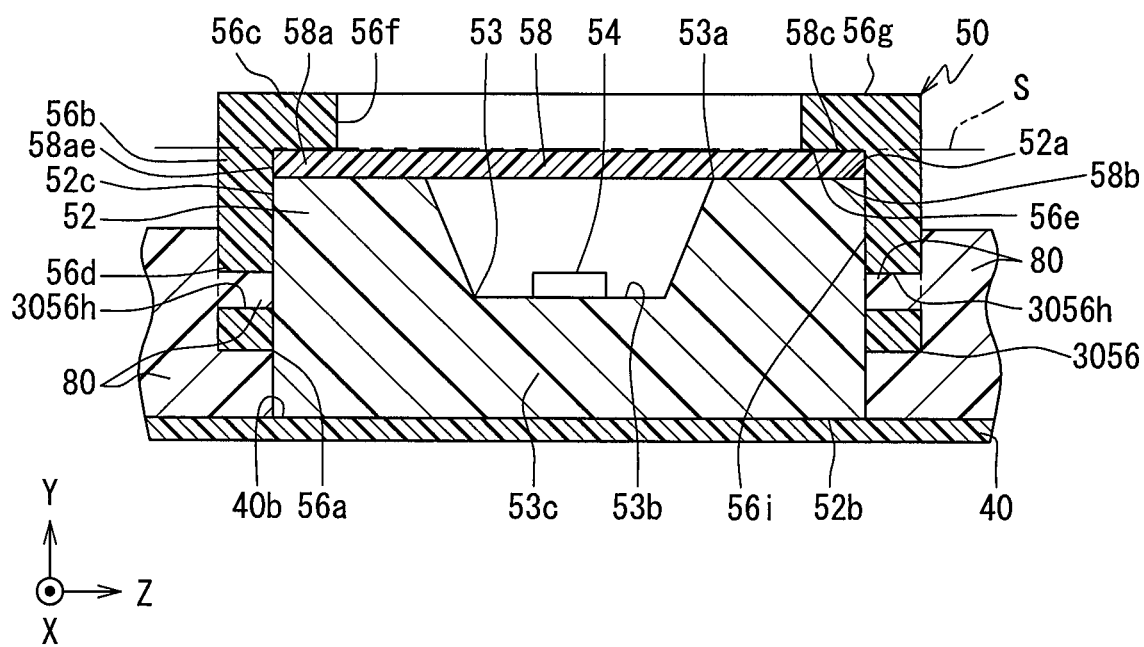
FIG. 15 is a cross-sectional view showing a sensor unit in a third embodiment.
Figure 16:
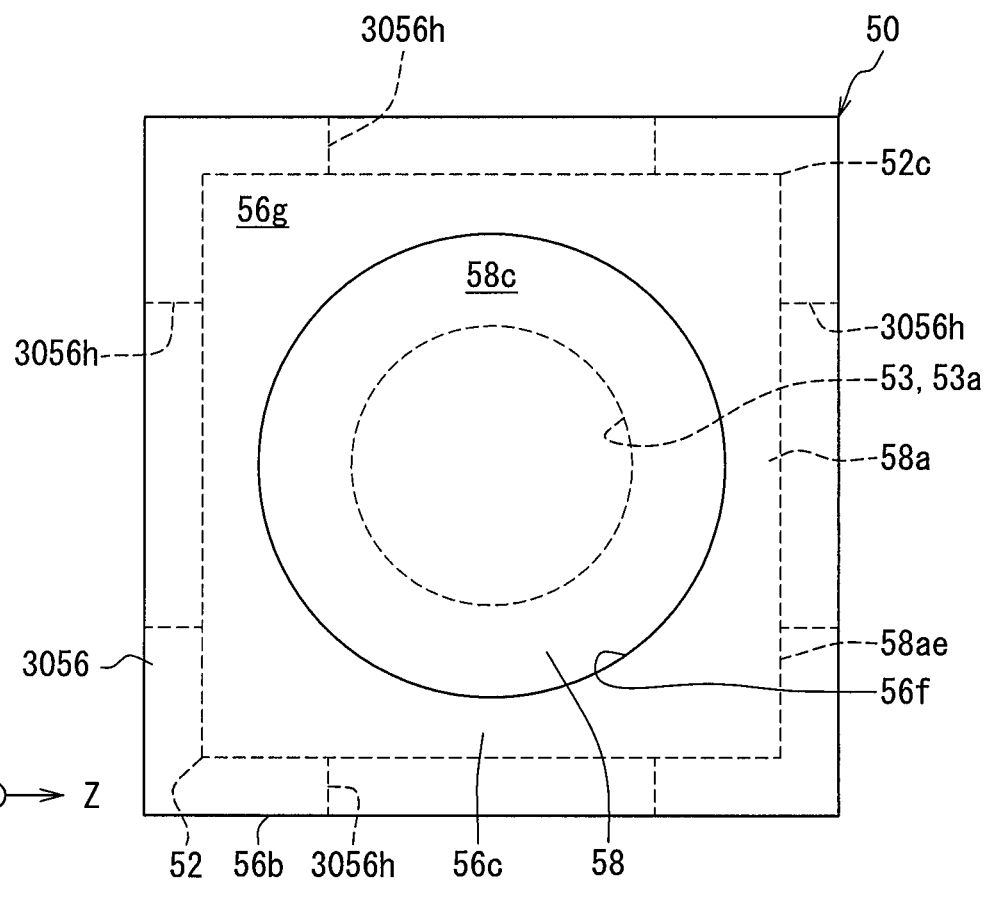
FIG. 16 is a plan view showing the sensor unit in the third embodiment.

The third embodiment is a modified example of the second embodiment. As shown in FIGS. 15 and 16, a sensor cover 3056 having a bottomed cup shape according to the third embodiment has a through hole portion 3056h different from that of the second embodiment in the cover peripheral wall portion 56b. The through hole portion 3056h is provided on each of the four walls of the rectangular tubular shape in the cover peripheral wall portion 56b. Each through hole portion 3056h penetrates the embedded portion 56d of the cover peripheral wall portion 56b embedded in the potting resin body 80 in the X direction or the Z direction. Here, in particular, each through hole portion 3056h of the third embodiment penetrates the embedded portion 56d between an end portion on the cover opening portion 56a side and an end portion on the cover bottom wall portion 56c side of the cover peripheral wall portion 56b.

Figure 17:
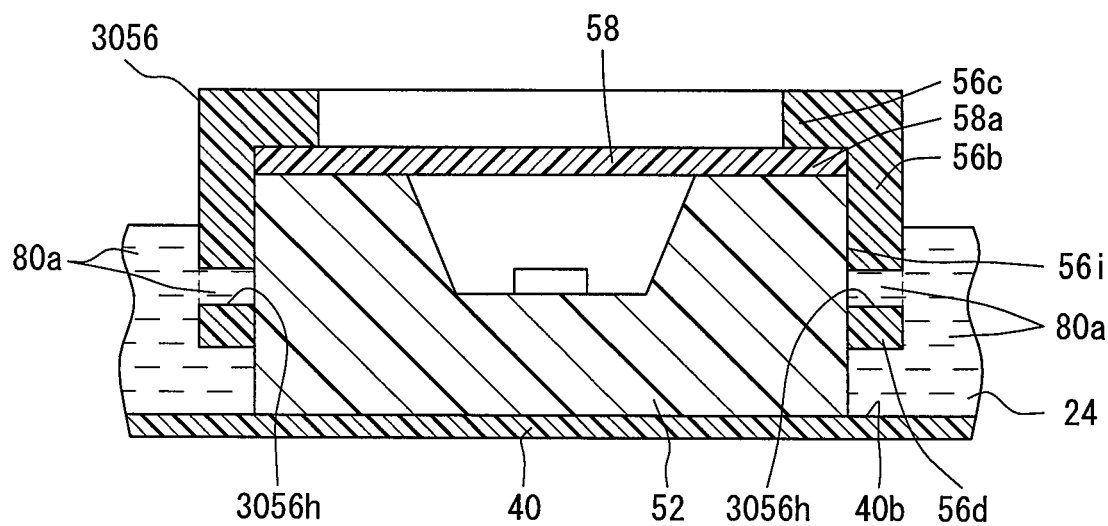
FIG. 17 is a schematic view for explaining a method of manufacturing the sensor unit in the third embodiment.

As shown in FIG. 17, in the third embodiment, the thermosetting resin 80a is filled in each through hole portion 3056h in a hot melted state, and then it enters into a fitting clearance 56i between the sensor body 52 and the cover peripheral wall portions 56b and is cooled and hardened. As a result, as shown in FIG. 15, the potting resin body 80 fills the inside of each through hole portion 3056h and is provided along the fitting clearance 56i between the sensor body 52 and the cover peripheral wall portion 56b from each of the through hole portions 3056h.

Figure 27:
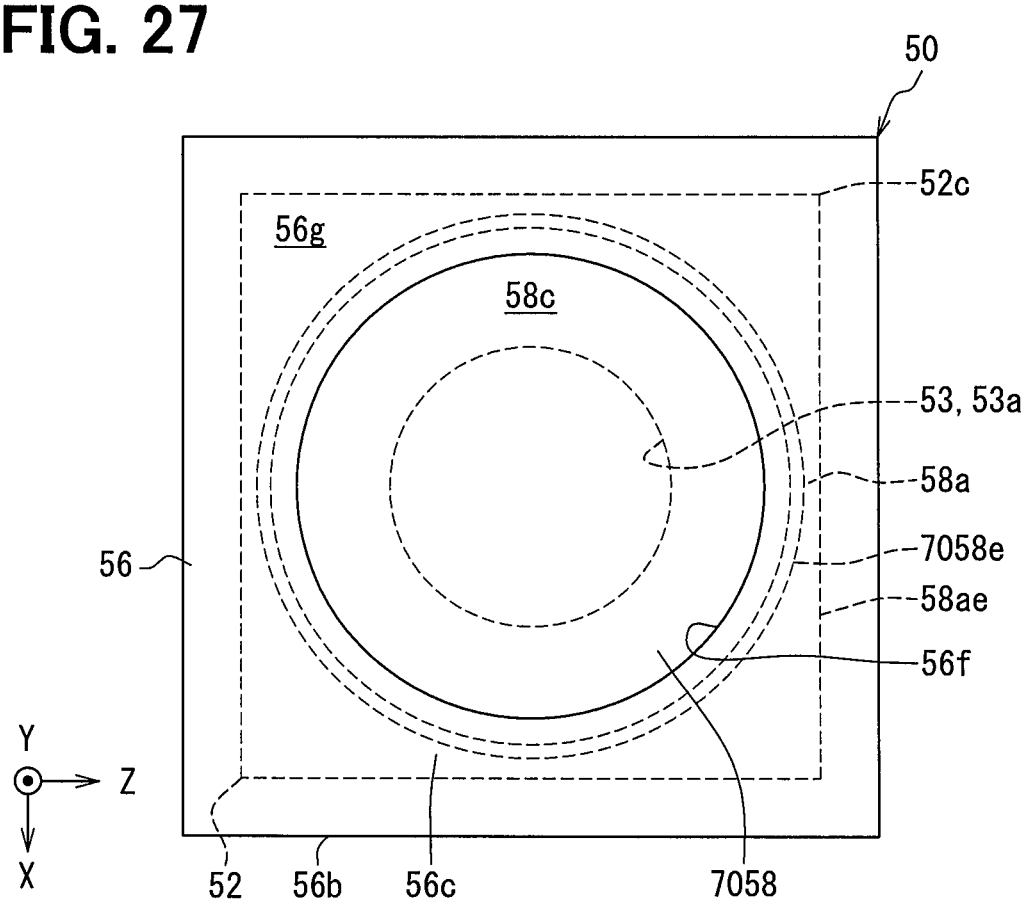
FIG. 27 is a plan view showing a sensor unit in the seventh embodiment.

As described above, in the sensor cover 3056 having a bottomed cup shape according to the third embodiment, the through hole portion 3056h penetrates the cover peripheral wall portion 56b between the end portion on the cover opening portion 56a side and the end portion on the cover bottom wall portion 56c side. According to this configuration, the thermosetting resin 80a, which is the potting resin body 80 before curing, is injected into the through hole portion 3056h, whereby the internal pressure of the injected resin is utilized and the lifting of the sensor cover 3056 with respect to the sensor substrate 40 can be suppressed. Therefore, since the sensor cover 3056 is fixed at the intended position with respect to the sensor substrate 40, it is possible to prevent the sensor filter 58 between the sensor cover 3056 and the sensor body 52 from deviating from the regular position. In the third embodiment exhibiting such effects, the load according to the first embodiment may be continuously applied in the immersed state of the embedded portion 56d in the thermosetting resin 80a, and as shown in FIG. 27, it is unnecessary to use continuously the above mentioned load by using the own weight of the sensor cover 3056.

Fourth Embodiment

The fourth embodiment is a modified example of the first embodiment.

Figure 18:
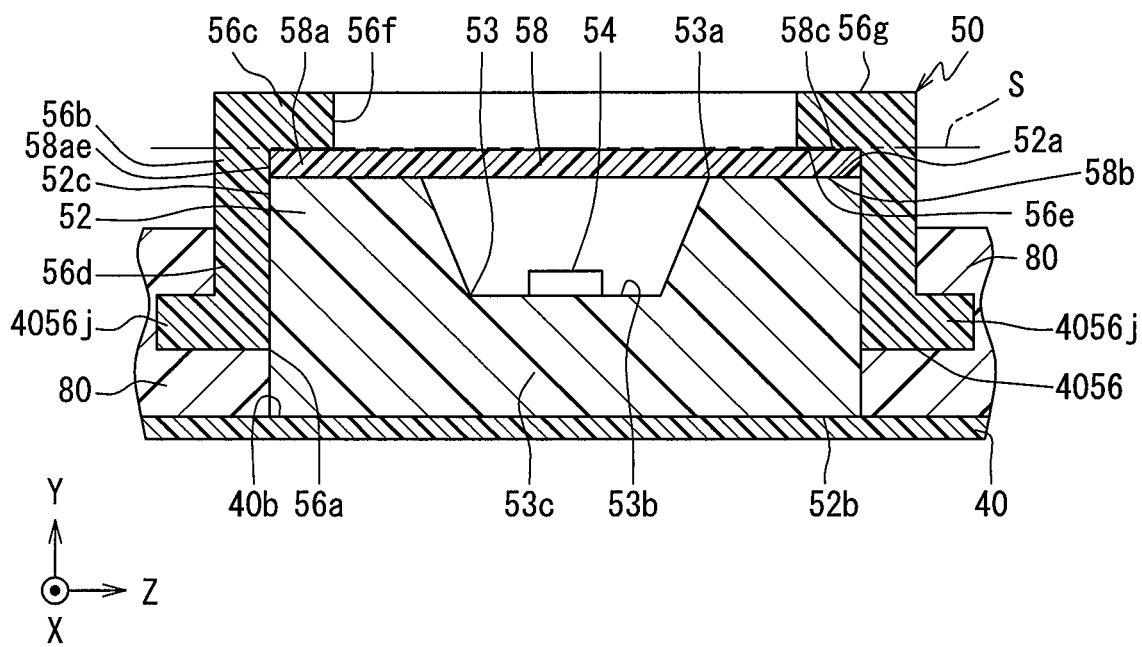
FIG. 18 is a cross-sectional view showing a sensor unit in a fourth embodiment.
Figure 19:
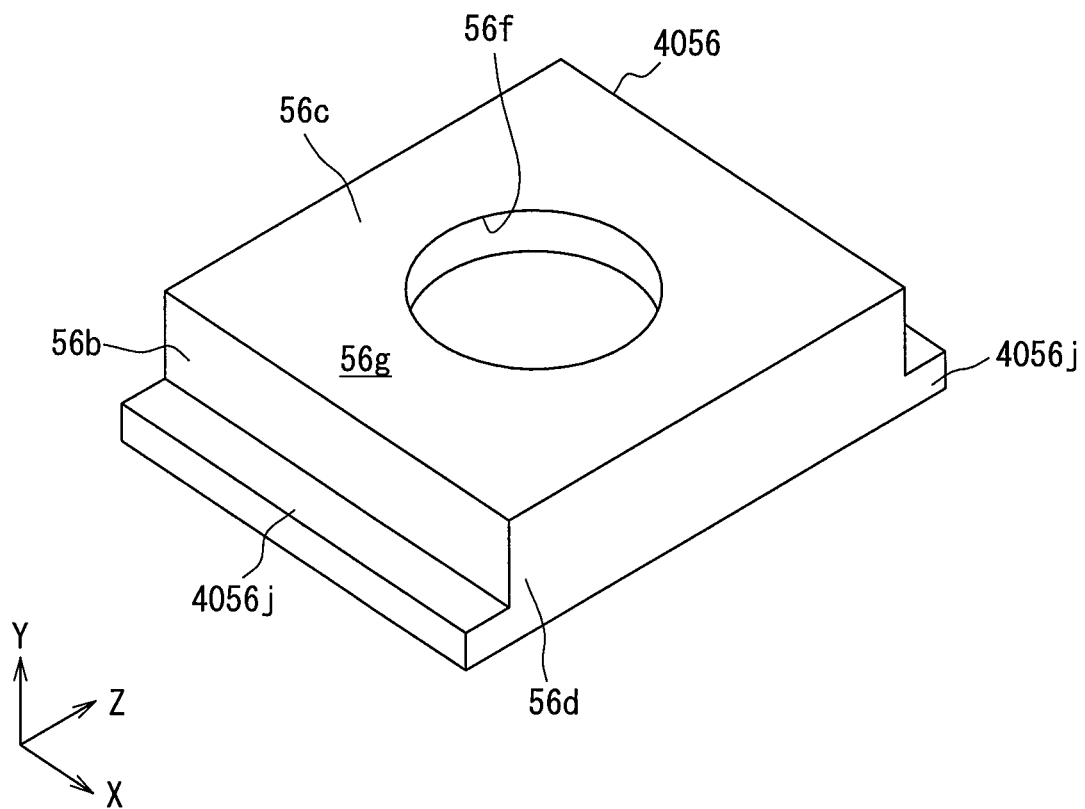
FIG. 19 is a perspective view showing the sensor unit in the fourth embodiment.

As shown in FIGS. 18 and 19, the sensor cover 4056 having a bottomed cup shape according to the fourth embodiment has a plurality of anchor portions 4056j. The anchor portions 4056j protrudes one by one from two opposing walls of the rectangular tubular four walls at the cover peripheral wall portion 56b. Each anchor portion 4056j protrudes from the embedded portion 56d in the potting resin body 80 of the cover peripheral wall portion 56b in a direction opposite to the sensor body 52 along the Z direction. Here, in particular, each anchor portion 4056j of the fourth embodiment protrudes from the embedded portion 56d toward the opposite side with a substantially constant thickness. Due to such protrusion configuration, each of the anchor portions 4056j is entirely embedded in the potting resin body 80. Any of the configurations of the second and third embodiments may be adopted as the configuration of the sensor body 50 other than the one described above, in place of the configuration described in the first embodiment.

In the bottomed cup-shaped sensor cover 4056 according to the fourth embodiment, the anchor portions 4056j projecting from the cover peripheral wall portion 56b are embedded at the outer peripheral side of the sensor body 52. As a result, in the sensor cover 4056, the anchor portions 4056j are caught in the hardened potting resin body 80, so that it is difficult for the sensor cover 4056 to come off from the potting resin body 80. The surface area of the anchor portions 4056j can be added to the embedded surface area that can be secured on the outer peripheral side of the sensor body 52. Therefore, the cover peripheral wall portion 56b and the anchor portions 4056j of the sensor cover 4056 fixed in position with respect to the sensor substrate 40 can enhance the effect of suppressing the sensor filter 58 from being separated from the regular position into the flow passage.

Fifth Embodiment

The fifth embodiment is a modified example of the first embodiment.

Figure 20:
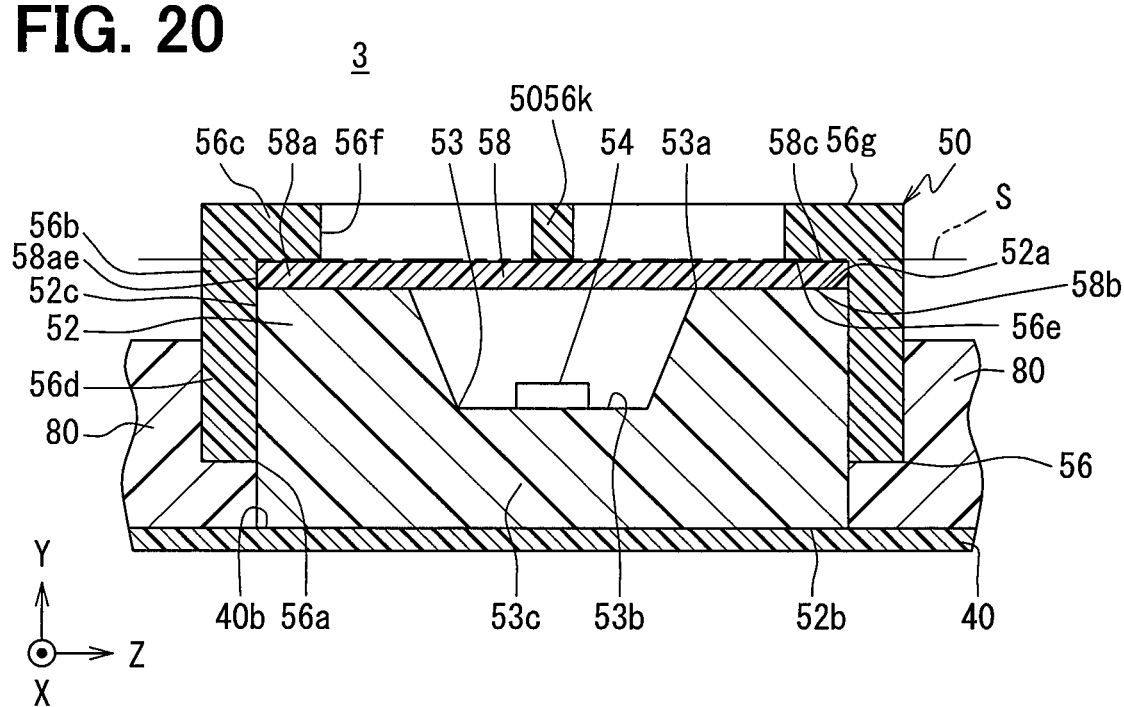
FIG. 20 is a cross-sectional view showing a sensor unit in a fifth embodiment.
Figure 21:
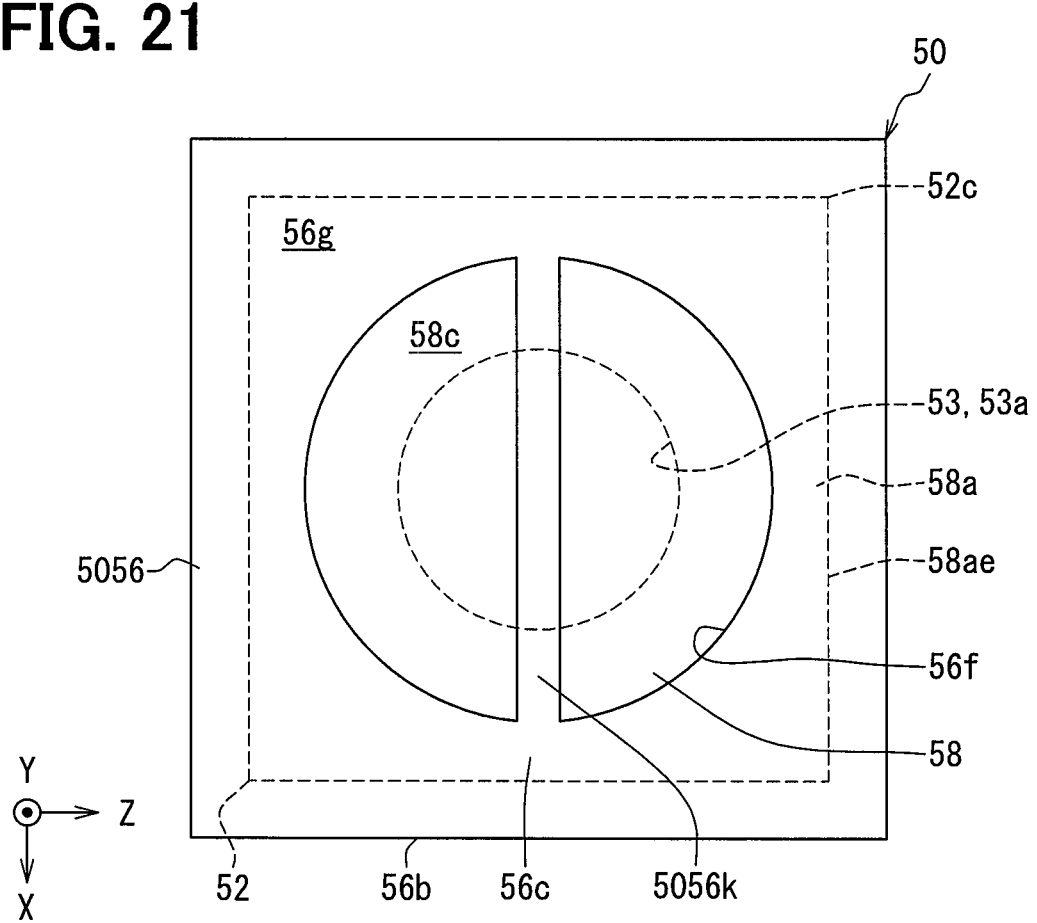
FIG. 21 is a plan view showing the sensor unit in the fifth embodiment.

As shown in FIGS. 20 and 21, the bottomed cup-shaped sensor cover 5056 according to the fifth embodiment has a overhanging portion 5056k. The overhanging portion 5056k protrudes toward the inner peripheral side of the cover window 56f at the cover bottom wall portion 56c of the sensor cover 5056. Here, in particular, the overhanging portion 5056k of the fifth embodiment protrudes from two positions opposed to each other in the radial direction at the cover window 56f having a circular contour and connects the two portions. In particular, the overhanging portion 5056k of the fifth embodiment is in surface contact with the side surface 58c opposite to the sensor body 52 of the sensor filter 58 and on the inner surface 56e side of the cover bottom wall portion 56c. Any of the configurations of the second to fourth embodiments may be adopted as the configuration of the sensor body 50 other than the one described above, in place of the configuration described in the first embodiment.

When the sensor filter 58 is deformed due to vibration, cold heat change or the like and enters the inner circumferential side of the cover window 56f, the sensor filter 58 may be detached from the regular position. However, in the sensor cover 5056 according to the fifth embodiment, it is possible to reliably suppress that the deformed sensor filter 58 enters into the inner peripheral side of the cover window 56f and is separated from the cover window 56f by the overhanging portion 5056k projecting toward the inner peripheral side.

Sixth Embodiment

The sixth embodiment is a modified example of the first embodiment.

Figure 22:
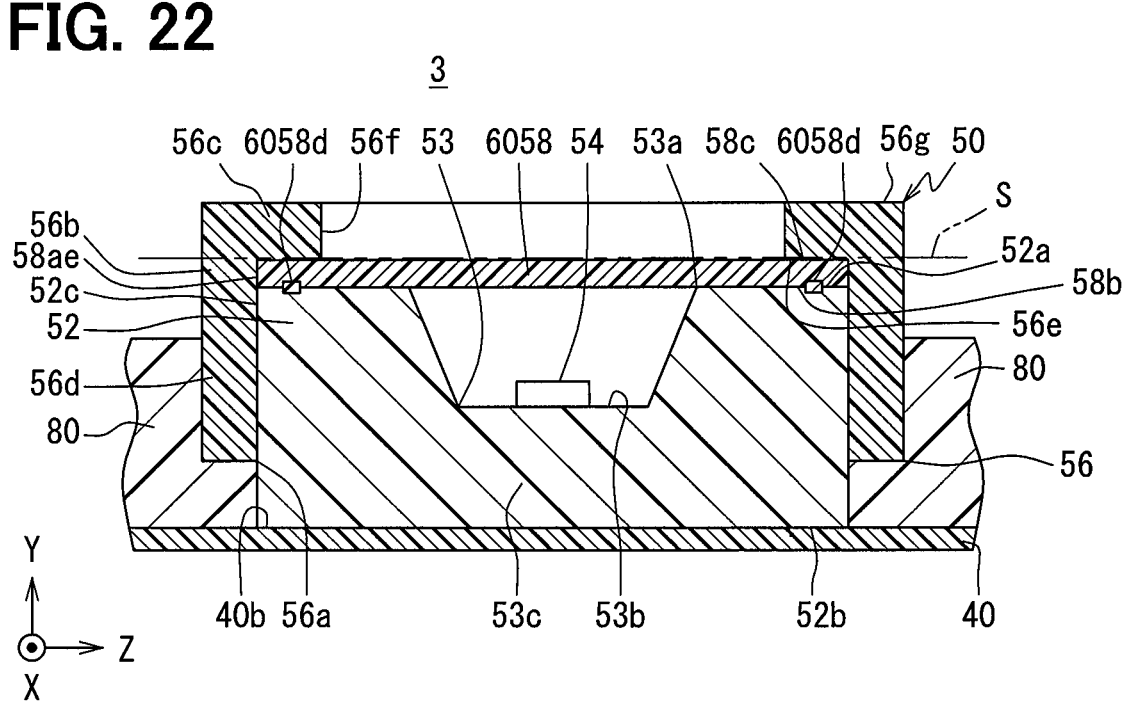
FIG. 22 is a cross-sectional view showing a sensor unit in a sixth embodiment.
Figure 23:
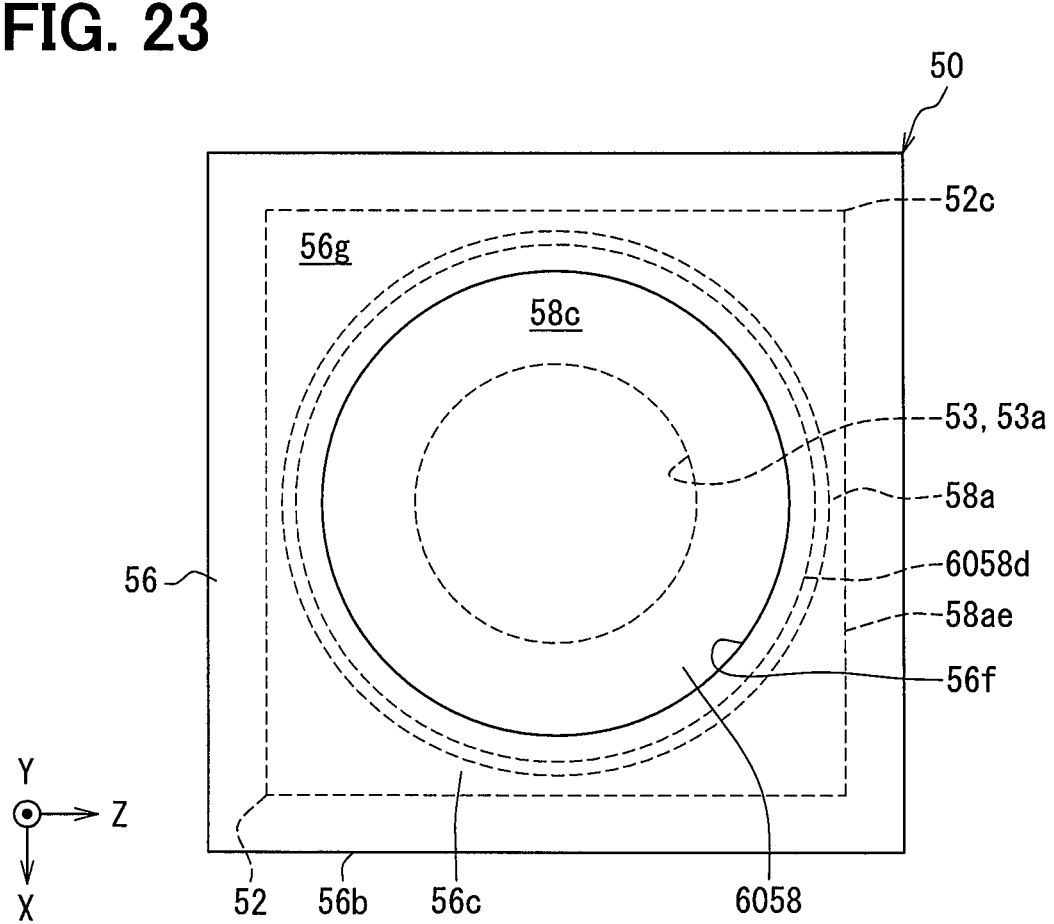
FIG. 23 is a plan view showing the sensor unit in the sixth embodiment.

As shown in FIG. 22, in the sensor filter 6058 according to the sixth embodiment, one surface 58b of the filter peripheral portion 58a is bonded to the side surface 52a opposite to the mounting surface 40b of the sensor body 52 in a surface contact state by, for example, welding or bonding. As a result, as shown in FIGS. 22 and 23, the filter peripheral portion 58a is provided with a body side connecting portion 6058d on the side of the sensor body 52, and the body side connecting portion 6058d is formed as a continuous circle belt shape with a substantially constant width in a plan view in the Y direction.

The filter peripheral portion 58a in the sensor filter 6058 is in surface contact with the inner surface 56e of the bottom wall portion 56c of the sensor cover 56 shown in FIG. 22 at the side surface 58c opposite to the sensor body 52 so that the filter peripheral portion 58a is interposed between the sensor body 52 and the bottom wall portion 56c. In the sensor filter 6058 joined to the sensor body 52 in the interposed state, a slight deformation of the filter peripheral portion 58a may be occurred due to a microscopically roughness of each of the sensor body 52 and the bottom wall portion 56c contacting the filter peripheral portion 58a. A specification (for example, dimension and material) for the sensor filter 6058, the sensor body 52, and the bottom wall portion 56c is determined in such a manner that the slight deformation is targeted within a permissible range not hindering a filtering performance of the sensor filter 6058.

Figure 24:
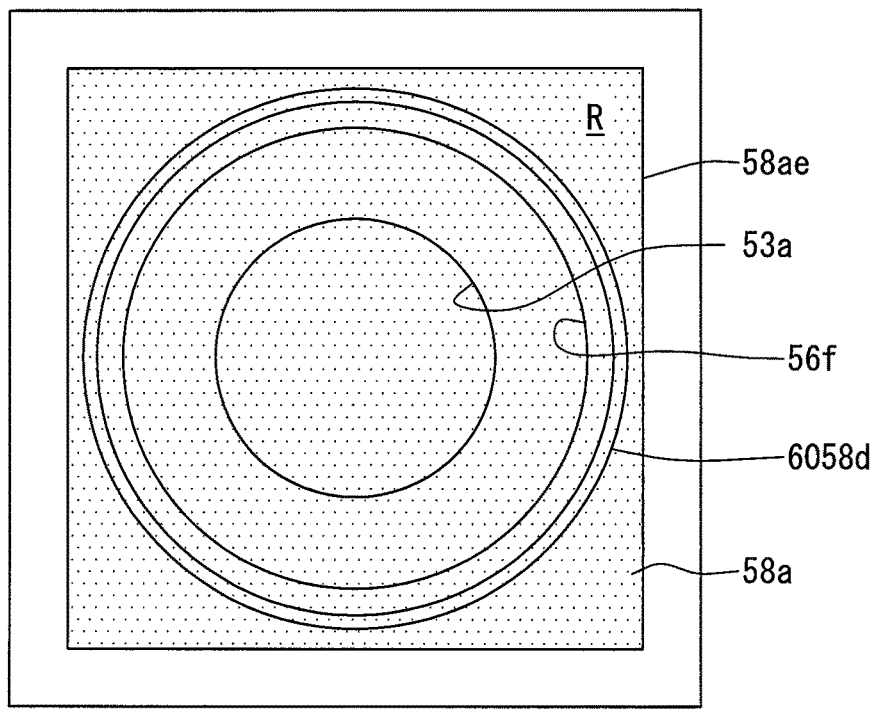
FIG. 24 is a schematic diagram showing a detailed configuration of the sensor unit in the sixth embodiment.

As shown in FIG. 24, under the same definition of the filtering area R in the first embodiment, in the projection view in Y direction with respect to the virtual plane S, the cover window 56f, the body opening portion 53a, and the body side connecting portion 6058d are positioned in the filtering area R. In the projection view in Y direction with respect to the virtual plane S, the body side connecting portion 6058d is positioned outside of the contour of the body opening portion 53a and outside of the contour of the cover window 56f within the filtering area R. Namely, in the projection view in Y direction with respect to the virtual plane S, the body side connecting portion 6058d is positioned between the rectangular contour 58ae of the filter peripheral portion 58a and the contour of the cover window 56f.

Figure 25:
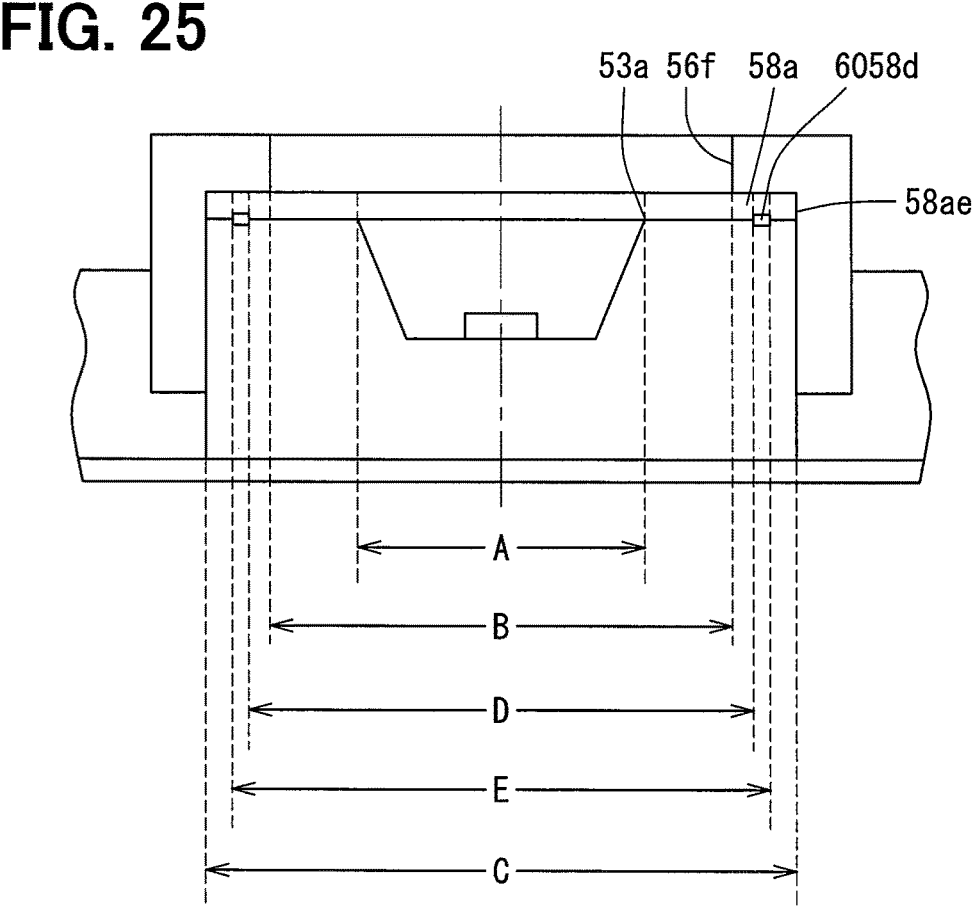
FIG. 25 is a schematic diagram showing a detailed configuration of the sensor unit in the sixth embodiment.

According to the sixth embodiment, the body side connecting portion 6058d having a circle belt shape, the body opening portion 53a having a circle contour shape, the cover window 56f, and a rectangular contour 58ae as the filtering area R are arranged in such a manner that each center of the body side connecting portion 6058d, the body opening portion 53a, the cover window 56f, and a rectangular contour 58ae is substantially aligned, as shown in FIG. 25. In the second embodiment, the diameter D of the inner side of the body side connecting portion 6058d, the diameter E of the outer side of the body side connecting portion 6058d, the diameter A of the circle contour of the body opening portion 53a, the diameter B of the circle contour of the cover window 56f, and the minimum distance C (minimum distance in the radial direction) of the rectangular contour 58ae of the filter peripheral portion 58a in the filtering area R satisfy the following formula 2, as shown in FIG. 25. Any of the configurations of the second to fifth embodiments may be adopted as the configuration of the sensor body 50 other than the one described above, in place of the configuration described in the first embodiment.

$$A<B<D<E<C \quad \text{(Formula 2)}$$

As described above, since the sensor filter 6058 according to the sixth embodiment is joined to the sensor body 52 in a state of being held between the sensor body 52 and the sensor cover 56, it is possible to reliably suppress the detachment of the sensor filter 6058 from the regular position.

Seventh Embodiment

The seventh embodiment is a modified example of the first embodiment.

Figure 26:
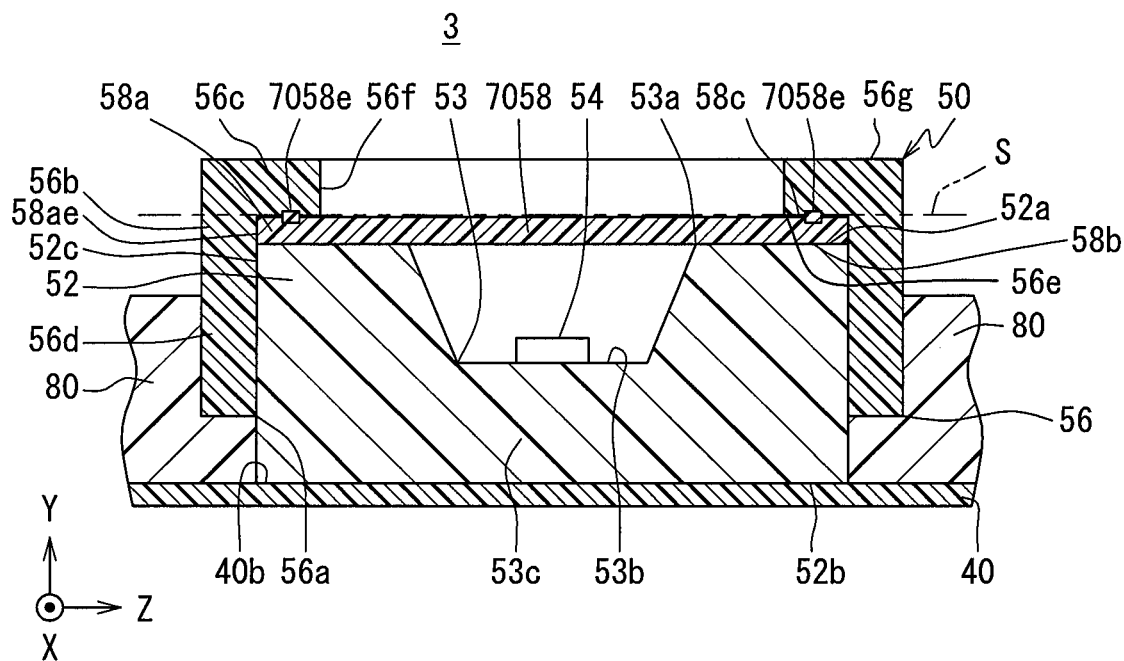
FIG. 26 is a cross-sectional view showing a sensor unit in a seventh embodiment.

As shown in FIG. 26, in a sensor filter 7058 according to the seventh embodiment, one surface 58c of the filter peripheral portion 58a opposite to the sensor body 52 is connected to the inner surface 56e of the bottom wall portion 56c in the sensor cover 56 in a surface contacting state by welded or bonded, etc. The filter peripheral portion 58a, as shown in FIGS. 26 and 27, is provided with a cover side connecting portion 7058e on the side of the sensor cover 56, and the cover side connecting portion 7058e is formed as a circle belt shape having a substantially same width in a plan view in Y direction.

The filter peripheral portion 58a in the sensor filter 7058 makes one surface 58b into surface-contact with the side surface 52a opposite to the mounting surface 40b of the sensor body 52 shown in FIG. 26 such that the filter peripheral portion 58a is interposed between the sensor body 52 and the bottom wall portion 56c. In the sensor filter 7058 joined to the sensor cover 56 in the interposed state, a slight deformation of the filter peripheral portion 58a may be occurred due to a microscopically roughness of each of the sensor body 52 and the bottom wall portion 56c contacting the filter peripheral portion 58a. A specification (for example, dimension and material) for the sensor filter 7058, the sensor body 52, and the bottom wall portion 56c is determined in such a manner that the slight deformation is targeted within a permissible range not hindering a filtering performance of the sensor filter 7058.

Figure 28:
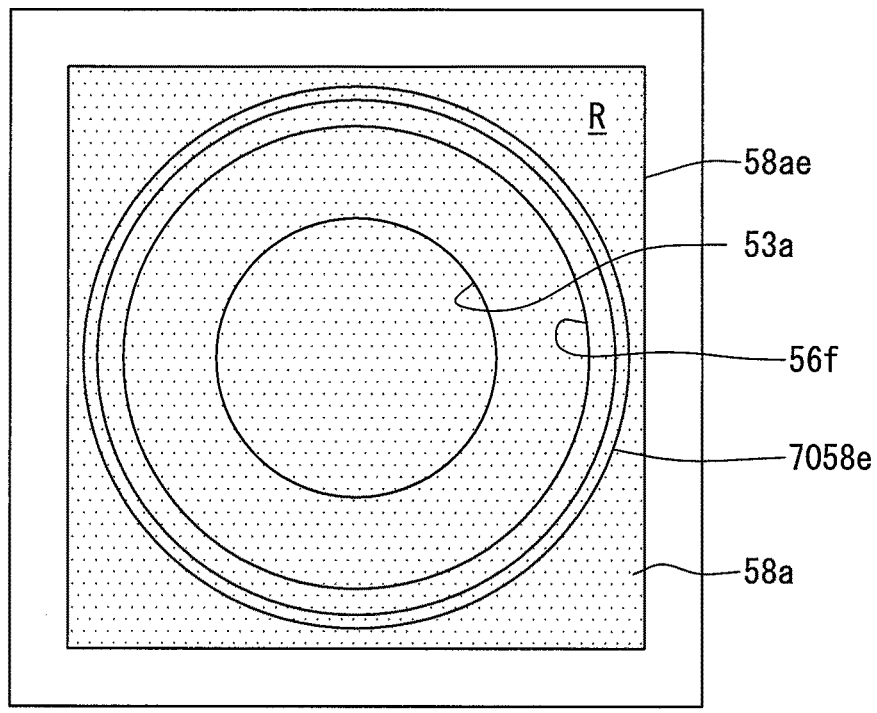
FIG. 28 is a schematic diagram showing a detailed configuration of the sensor unit in the seventh embodiment.

As shown in FIG. 28, under the same definition of the filtering area R in the first embodiment, in the projection view in Y direction with respect to the virtual plane S, the cover window 56f, the body opening portion 53a, and the cover side connecting portion 7058e are positioned in the filtering area R. In the projection view in Y direction with respect to the virtual plane S, the cover side connecting portion 7058e is positioned outside of the contour of the body opening portion 53a and outside of the contour of the cover window 56f within the filtering area R. Namely, in the projection view in Y direction with respect to the virtual plane S, the cover side connecting portion 7058e is positioned between the rectangular contour 58ae of the filter peripheral portion 58a and the contour of the cover window 56f.

Figure 29:
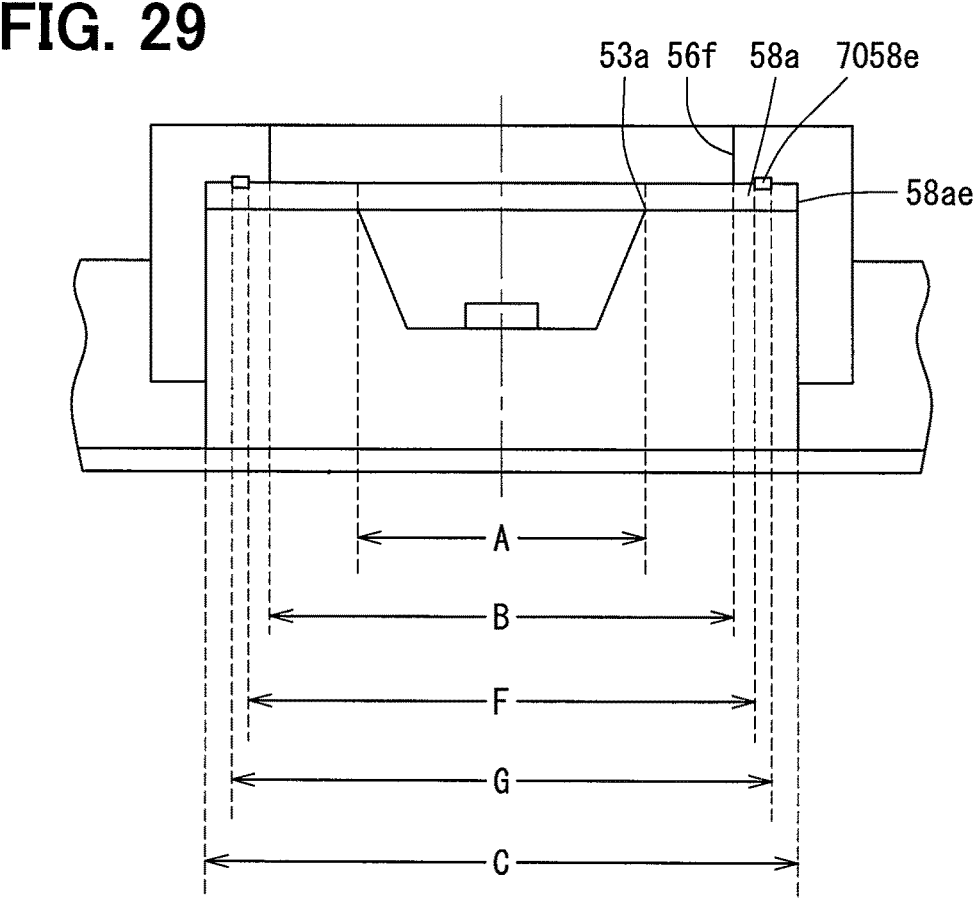
FIG. 29 is a schematic diagram showing a detailed configuration of the sensor unit in the seventh embodiment.

According to the seventh embodiment, the cover side connecting portion 7058e having a circle belt shape, the body opening portion 53a having a circle contour shape, the cover window 56f, and a rectangular contour 58ae as the filtering area R are arranged in such a manner that each center of the body side connecting portion 6058d, the body opening portion 53a, the cover window 56f, and a rectangular contour 58ae is substantially aligned, as shown in FIG. 29. In the seventh embodiment, the diameter F of the inner side of the cover side connecting portion 7058e, the diameter E of the outer side of the cover side connecting portion 7058e, the diameter A of the circle contour of the body opening portion 53a, the diameter B of the circle contour of the cover window 56f, and the minimum distance C (minimum distance in the radial direction) of the rectangular contour 58ae of the filter peripheral portion 58a in the filtering area R satisfy the following formula 3, as shown in FIG. 29. Any of the configurations of the second to fifth embodiments may be adopted as the configuration of the sensor body 50 other than the one described above, in place of the configuration described in the first embodiment.

$$A<B<F<G<C \qquad \text{(Formula 3)}$$

As described above, since the sensor filter 7058 according to the seventh embodiment is joined to the sensor cover 56 in a state of being held between the sensor body 52 and the sensor cover 56, it is possible to reliably suppress the detachment of the sensor filter 6058 from the regular position.

Eighth Embodiment

The eighth embodiment is a modified example combining the sixth and seventh embodiments.

Figure 30:
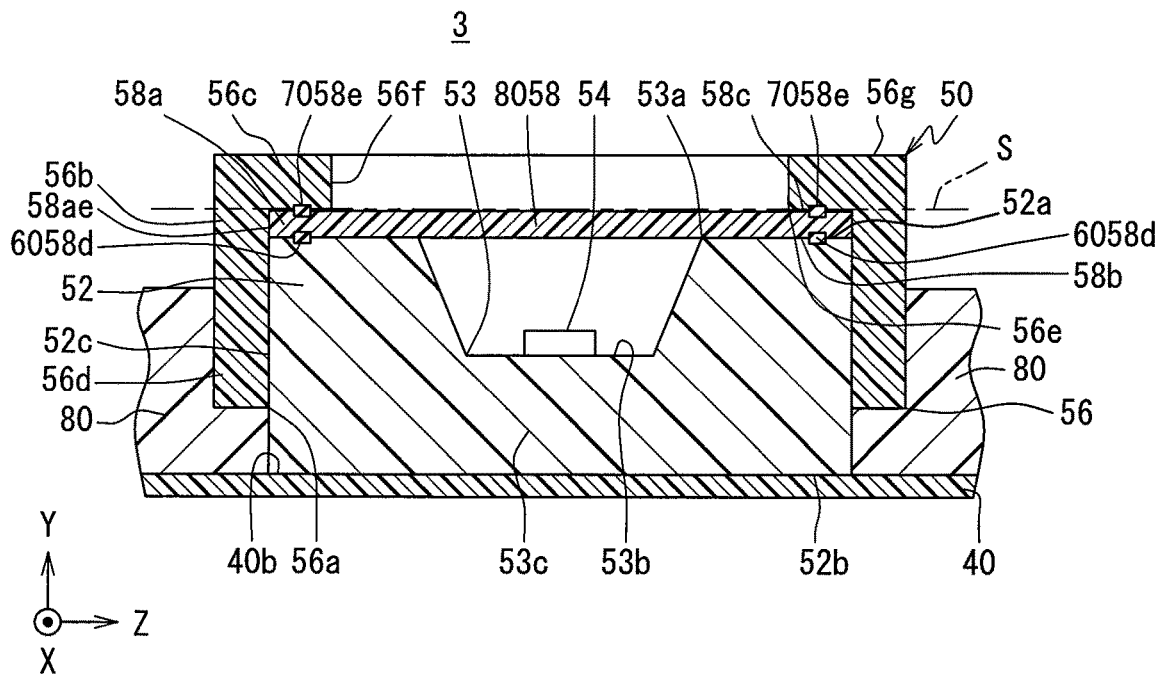
FIG. 30 is a cross-sectional view showing a sensor unit in a eighth embodiment.

As shown in FIG. 30, the sensor filter 8058 according to the eighth embodiment is joined to the sensor body 52 and the sensor cover 56 that interpose the sensor filter 8058 in a surface contacting state by welded or bonded, etc. As a result, the sensor filter 8058 forms a body side connecting portion 6058d similar to that of the sixth embodiment and a cover side connecting portion 7058e similar to the seventh embodiment.

Figure 31:
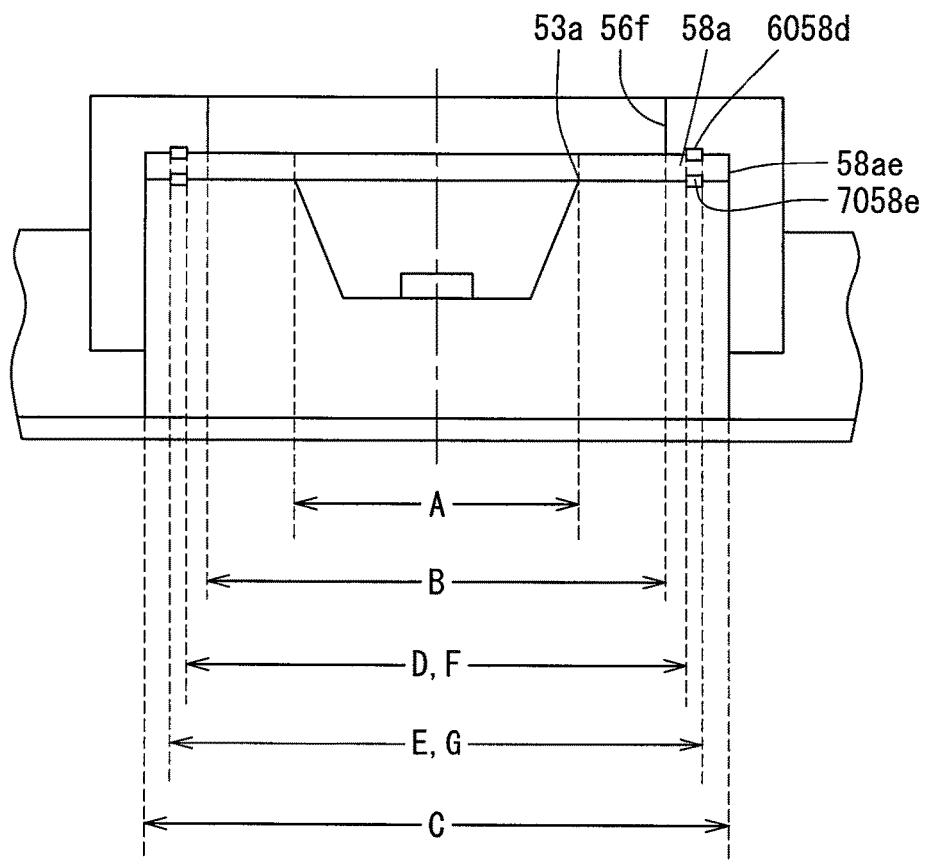
FIG. 31 is a schematic diagram showing a detailed configuration of the sensor unit in the eighth embodiment.

Here, under the definition of the filter region R similar to the first embodiment, both the projection view similar to the seventh embodiment and the projection view similar to the eighth embodiment are realized. In addition, in the seventh embodiment in which such a projection view is established, as shown in FIG. 31, the diameter D on the inner peripheral side of the body side connecting portion 6058d and the inner diameter side F of the cover side connecting portion 7058e substantially coincide. In addition, in the seventh embodiment, the peripheral side diameter E of the body side connecting portion 6058d and the peripheral side diameter G of the cover side connecting portion 7058e substantially coincide. Any of the configurations of the second to fifth embodiments may be adopted as the configuration of the sensor body 50 other than the one described above, in place of the configuration described in the first embodiment.

As described above, since the sensor filter 8058 according to the eighth embodiment is joined to the sensor body 52 and the sensor cover 56 in a state of being held between the sensor body 52 and the sensor cover 56, it is possible to reliably suppress the detachment of the sensor filter 7058 from the regular position.

Other Embodiments

Although a plurality of embodiments of the present disclosure have been described above, the present disclosure is not construed as being limited to these embodiments, and can be applied to various embodiments and combinations within a scope that does not deviate from the gist of the present disclosure.

Figure 32:
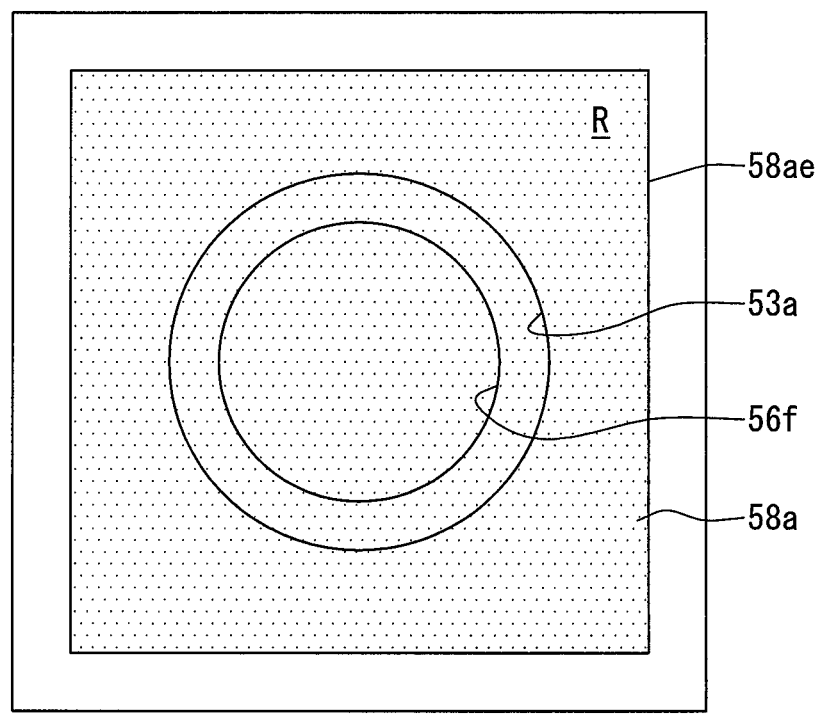
FIG. 32 is a schematic diagram showing a modified example of FIG. 9.
Figure 33:
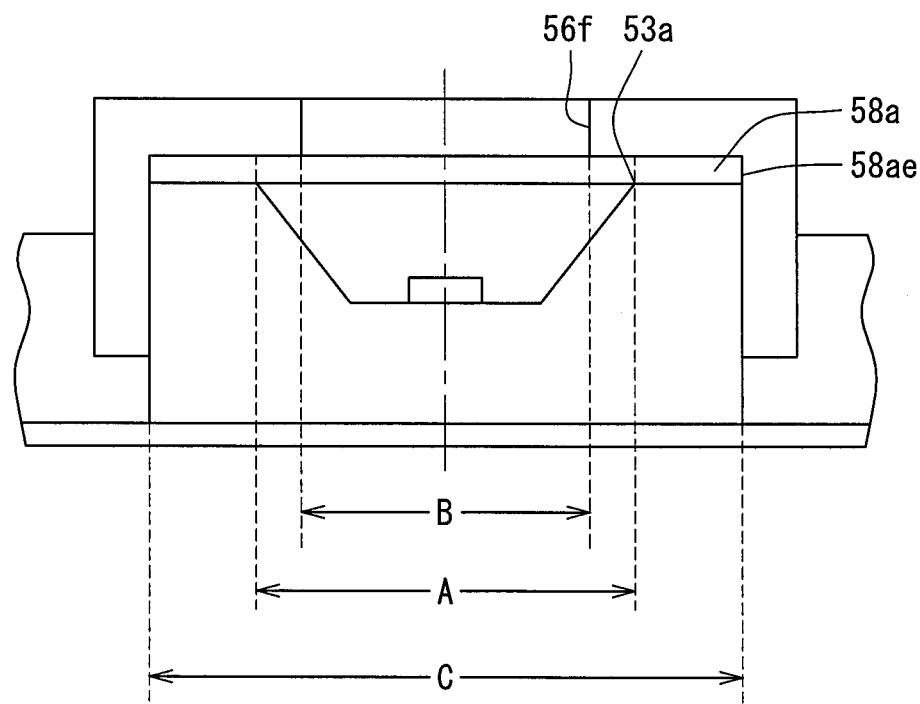
FIG. 33 is a schematic diagram showing a modified example of FIG. 10.
Figure 34:
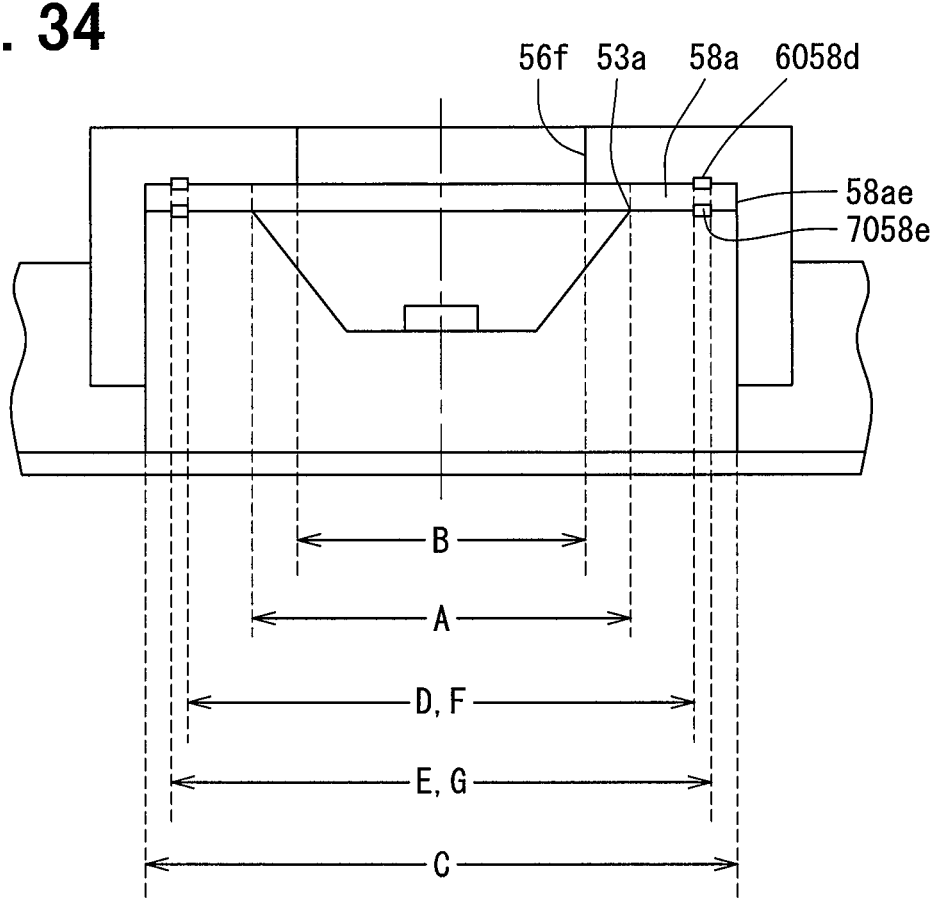
FIG. 34 is a schematic diagram showing a modified example of FIG. 31.

In the modification 1 relating to the first to the eighth embodiments, in the projection view in Y direction with respect to the virtual plane S, the cover window 56f is positioned in an inner side with respect to the contour of the body opening portion 53a within the filtering area R as shown in FIG. 32. In the modification 1 relating to the first to fifth embodiments, as shown in FIG. 33, the following formula 4 is satisfied. In the modification 1 relating to the sixth and the eighth embodiments, as shown in FIG. 34, the following formula 5 is satisfied. In the modification 1 relating to the seventh and the eighth embodiments, as shown in FIG. 34, the following formula 6 is satisfied. FIGS. 32 and 33 show the modification 1 relating to the first embodiment, FIG. 34 shows the modification 1 relating to the eighth embodiment.

$$B<A<C \qquad \text{(Formula 4)}$$

$$B<A<D<E<C \qquad \text{(Formula 5)}$$

$$B<A<F<G<C \qquad \text{(Formula 6)}$$

Figure 35:
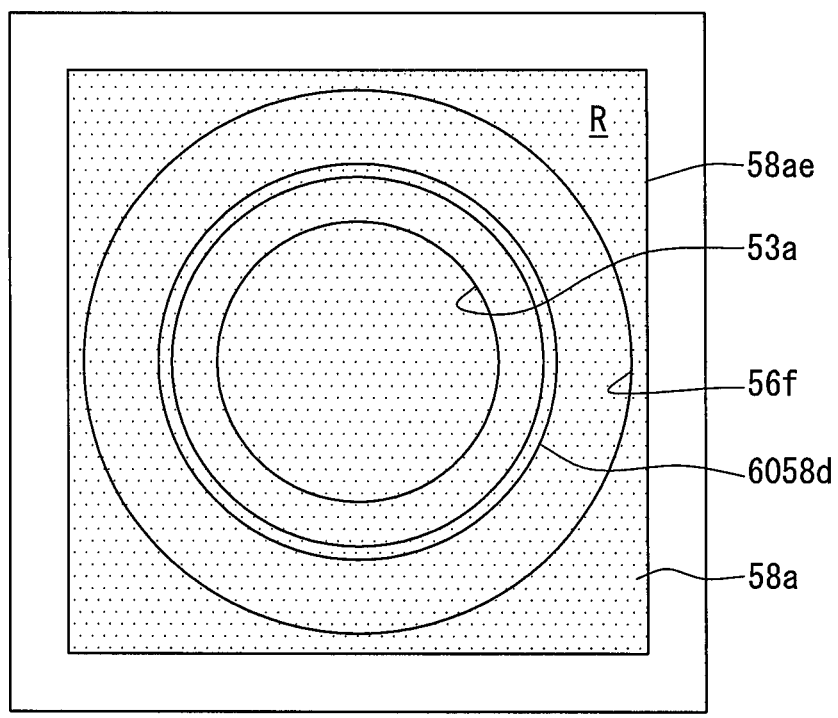
FIG. 35 is a schematic diagram showing a modified example of FIG. 24.
Figure 36:
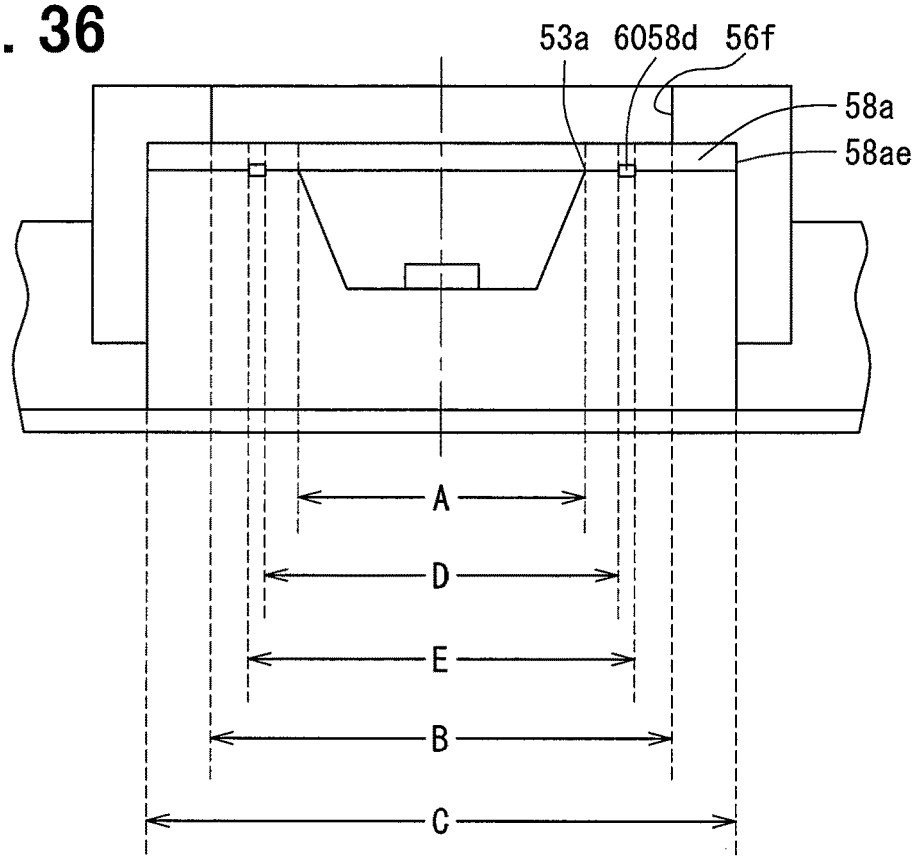
FIG. 36 is a schematic diagram showing a modified example of FIG. 25.

In the modification 2 relating to the sixth and the eighth embodiments, in the projection view in Y direction with respect to the virtual plane S, the body side connecting portion 6058d may be positioned within the outline of the cover window 56f and outside the contour of the body opening portion 53a within the filtering area R, as shown in FIG. 35. In the projection view in Y direction with respect to the virtual plane S, the body side connecting portion 6058*d* may be positioned between the contour of the body opening portion 53*a* and the contour of the cover window 56*f*. In the modification 2, as shown in FIG. 36, the following formula 7 is satisfied. FIGS. 35 and 36 show the modification 2 relating to the sixth embodiment.

$$A<D<E<B<C \qquad \text{(Formula 7)}$$

In a modification 3 relating to the eighth embodiment, the inner diameter D of the body side connecting portion 6058*d* may be different from the inner diameter F of the cover side connecting portion 7058*e*. In a modification 4 relating to the eighth embodiment, the outer diameter E of the body side connecting portion 6058*d* may be different from the outer diameter G of the cover side connecting portion 7058*e*.

Figure 37:
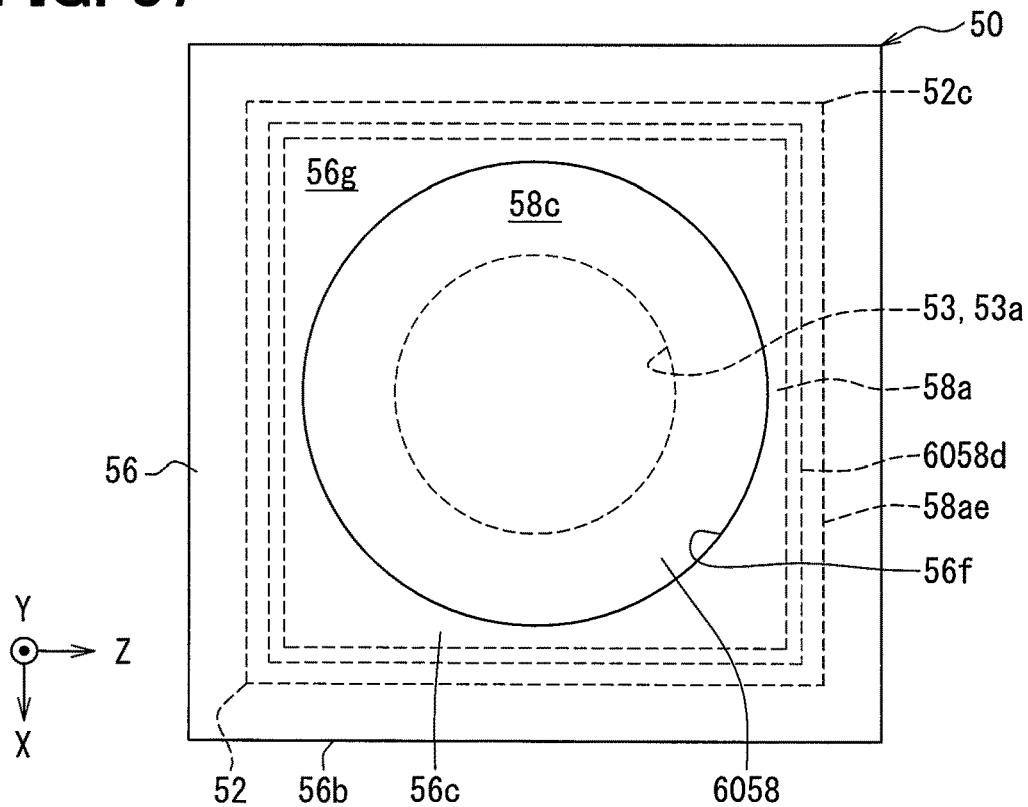
FIG. 37 is a plan view showing a modified example of FIG. 23.
Figure 38:
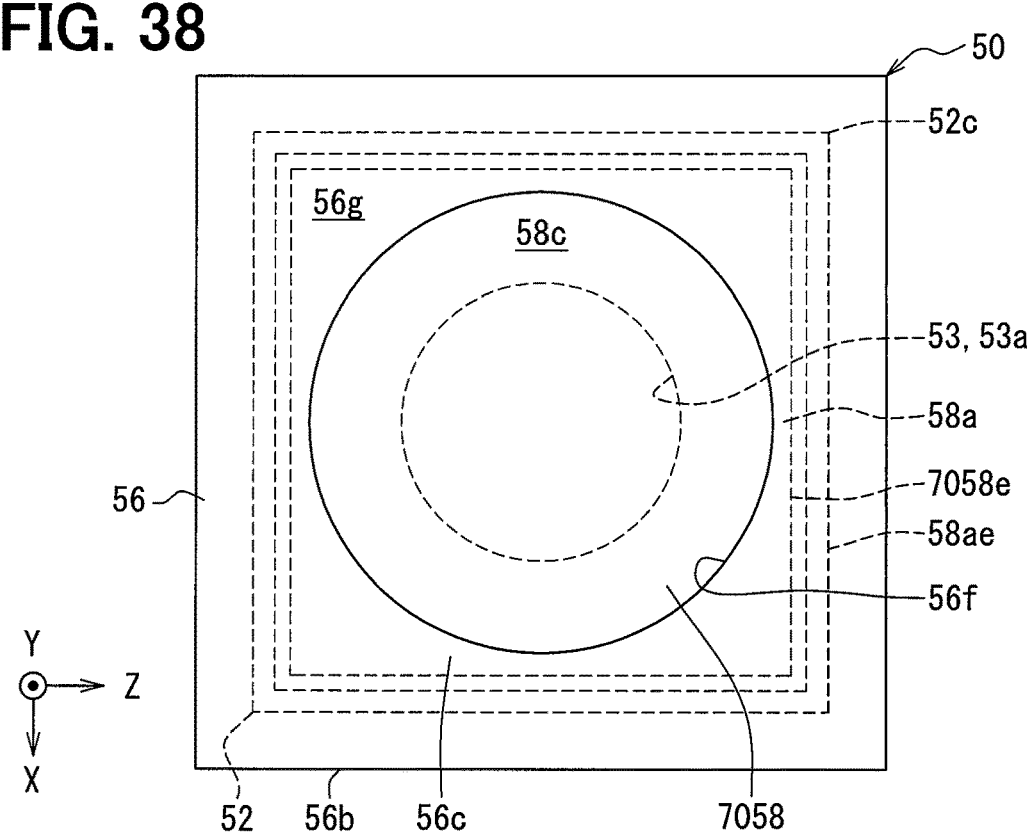
FIG. 38 is a plan view showing a modified example of FIG. 27.

In a modification 5 relating to the sixth and the eighth embodiments, in planar view in Y direction, the body side connecting portion 6058*d* may be formed as, for example, a rectangular belt shape as shown in FIG. 37 instead of a circle belt shape. In a modification 6 relating to the seventh and eighth embodiments, in planar view in Y direction, the cover side connecting portion 7058*e* may be formed as, for example, a rectangular belt shape shown in FIG. 38 instead of a circle belt shape. FIG. 37 shows the modification 5 relating to the sixth embodiment. FIG. 38 shows the modification 6 relating to the seventh embodiment.

Figure 39:
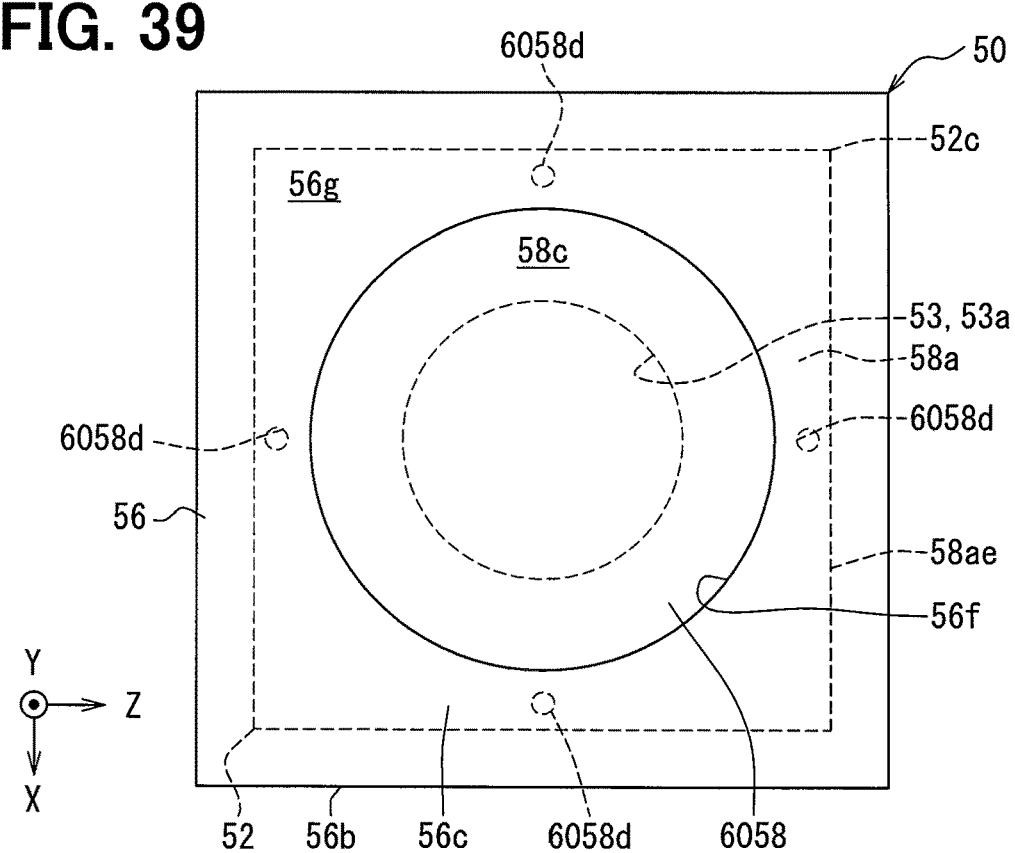
FIG. 39 is a plan view showing a modified example of FIG. 23.
Figure 40:
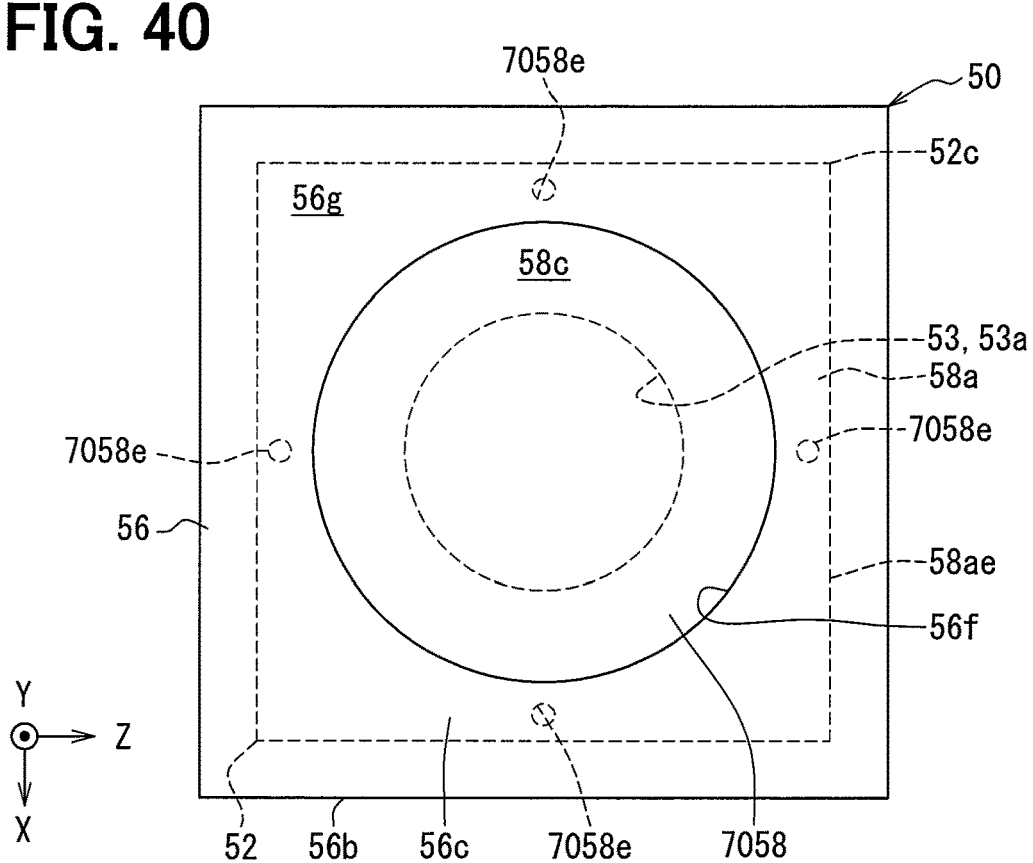
FIG. 40 is a plan view showing a modified example of FIG. 27.

In a modification 7 relating to the sixth and the eighth embodiments, as shown in FIG. 39, a plurality of the body side connecting portions 6058*d* may be provided at a predetermined gap in a circumferential direction on the filter peripheral portion 58*a*. In a modification 8 relating to the seventh and the eighth embodiments, as shown in FIG. 40, a plurality of the cover side connecting portions 7058*e* may be provided at a predetermined gap in a circumferential direction on the filter peripheral portion 58*a*. FIG. 39 shows the modification 7 relating to the sixth embodiment. FIG. 40 shows the modification 8 relating to the seventh embodiment.

Figure 41:
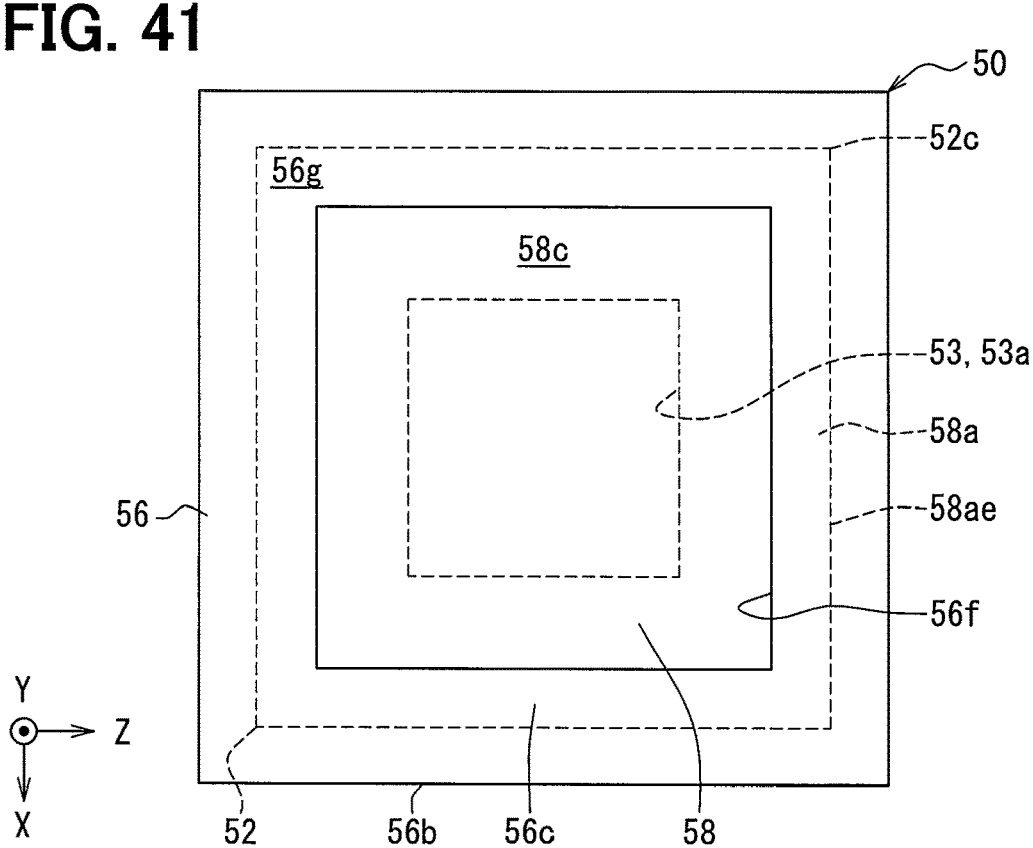
FIG. 41 is a plan view showing a modified example of FIG. 7.
Figure 42:
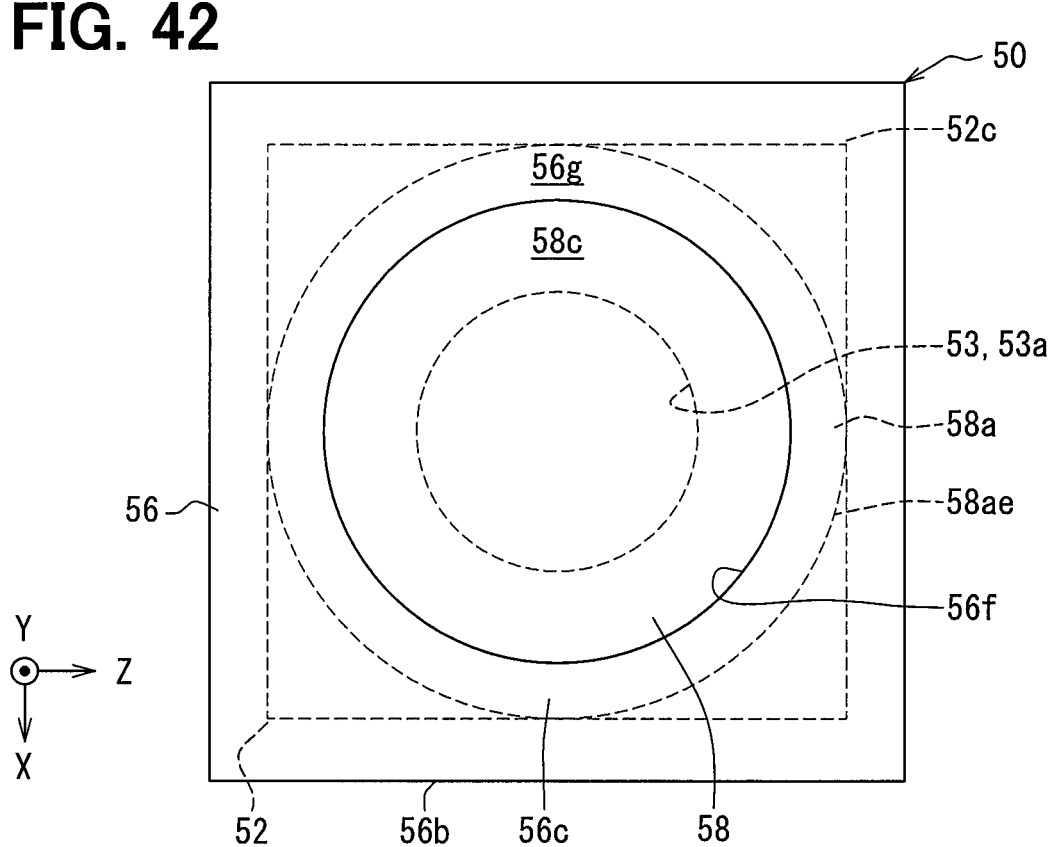
FIG. 42 is a plan view showing a modified example of FIG. 7.

In a modification 9 relating to the first to the eighth embodiments, in planar view in Y direction, as shown in FIG. 41, the body opening portion 53*a* may be formed as, for example, a rectangular shape instead of a circle shape. In a modification 10 relating to the first to the eighth embodiments, in planar view in Y direction, as shown in FIG. 41, the cover window 56*f* may be formed as, for example, a rectangular shape instead of a circle shape. In a modification 11 relating to the first to the eighth embodiments, in planar view in Y direction, as shown in FIG. 42, the filter peripheral portion 58*a* may be provided with the contour 58*ae* having, for example, a circle shape instead of a rectangular shape. FIG. 41 shows the modifications 9, 10 relating to the first embodiment, and FIG. 42 shows the modification 11 relating to the first embodiment.

Figure 43:
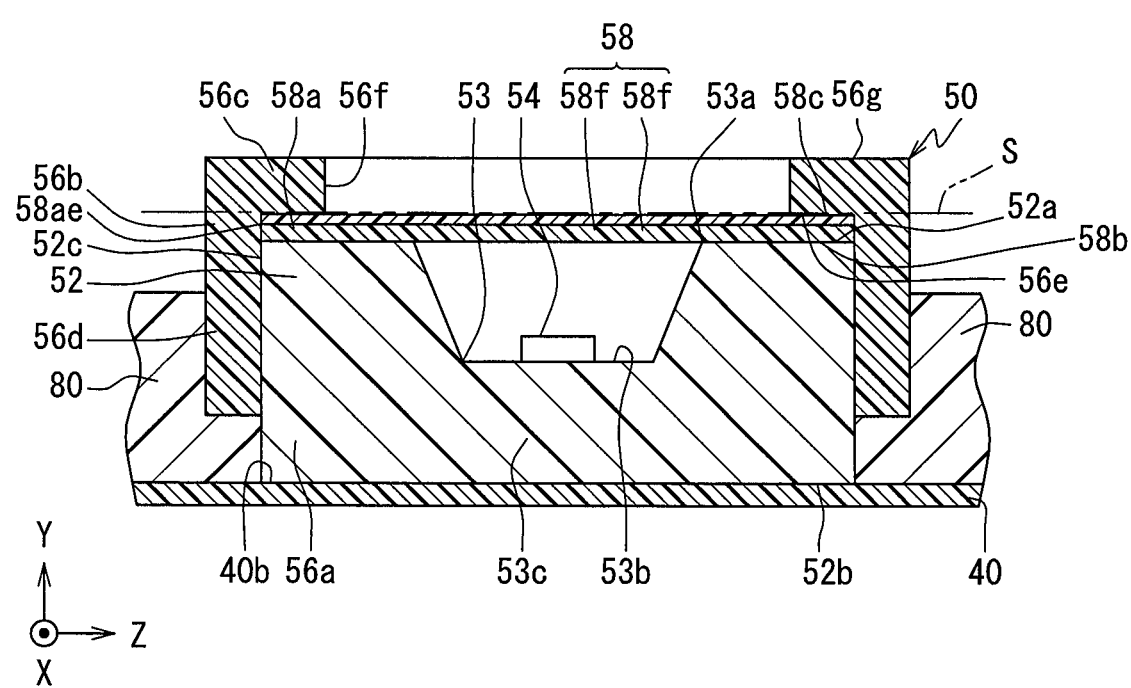
FIG. 43 is a cross-sectional view showing a modified example of FIG. 6.
Figure 44:
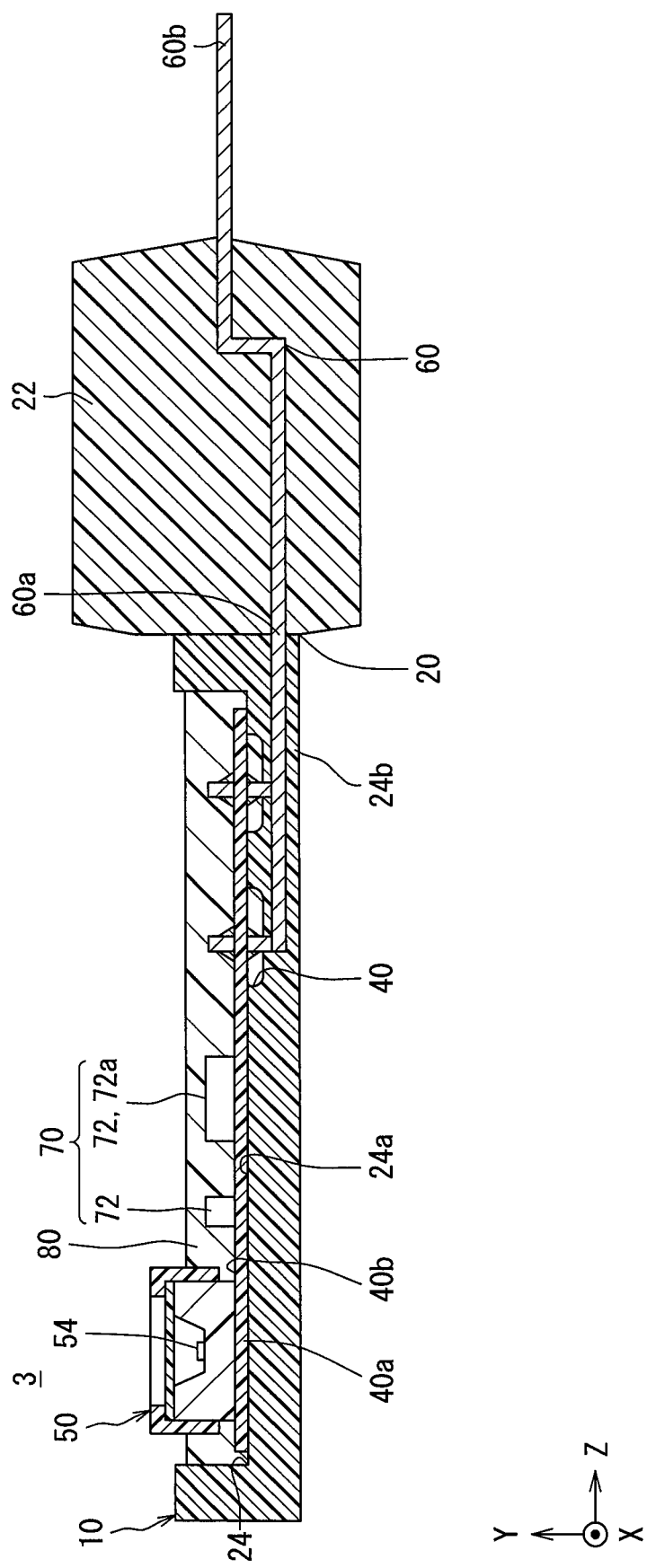
FIG. 44 is a cross-sectional view showing a modified example of FIG. 5.

In a modification 12 relating to the first to the eighth embodiments, the sensor filters 58, 6058, 7058, and 8058 are not only a porous filter made of PTFE but also, for example, a waterproof filter or an air-permeable filter. The filter used in the sixth to the eighth embodiments may be a fibrous filter made of other material by considering a bonding property. In a modification 13 relating to the first to the eighth embodiments, as shown in FIG. 43, the sensor filters 58, 6058, 7058, and 8058 are made from a plurality of filter elements 58*f*, each of which is different from each other as for a material, a roughness, and/or a thickness. In a modification 14 relating to the first to the eighth embodiments, as shown in FIG. 44, a reinforced plate 30 may be omitted, because the sensor substrate 40 is made from a hard substrate, such as a glass epoxy substrate instead of the soft flexible substrate. FIGS. 43 and 44 show respectively the modifications 13, 14 relating to the first embodiment.

Figure 45:
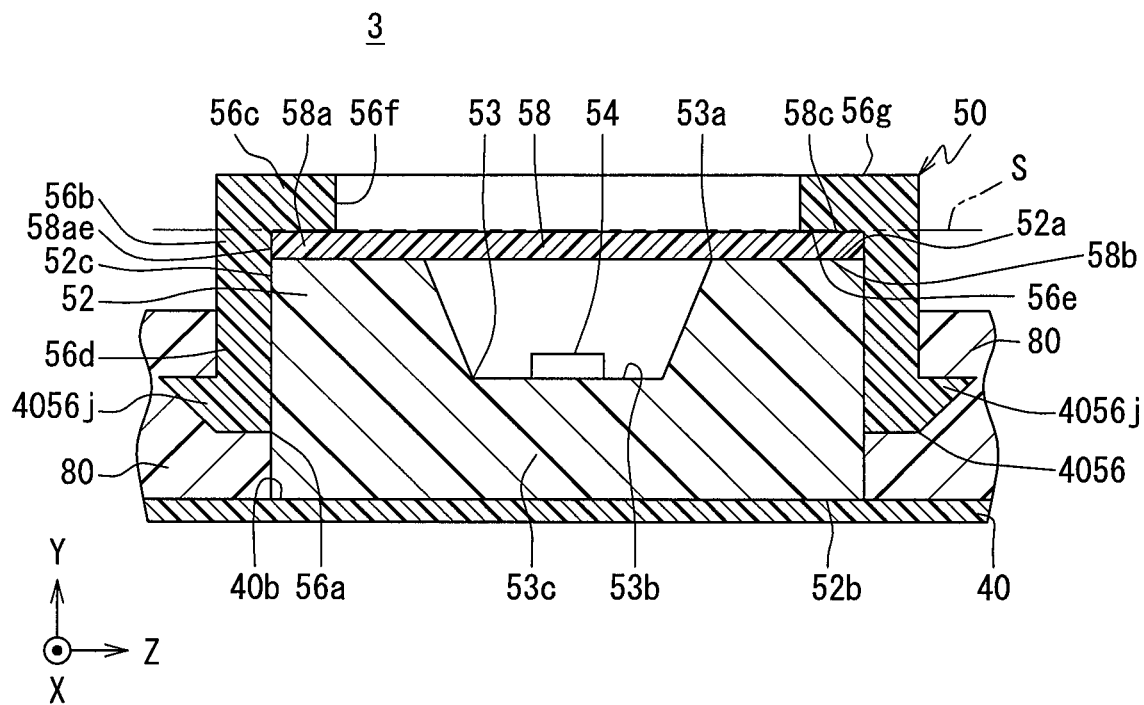
FIG. 45 is a cross-sectional view showing a modified example of FIG. 18.
Figure 46:
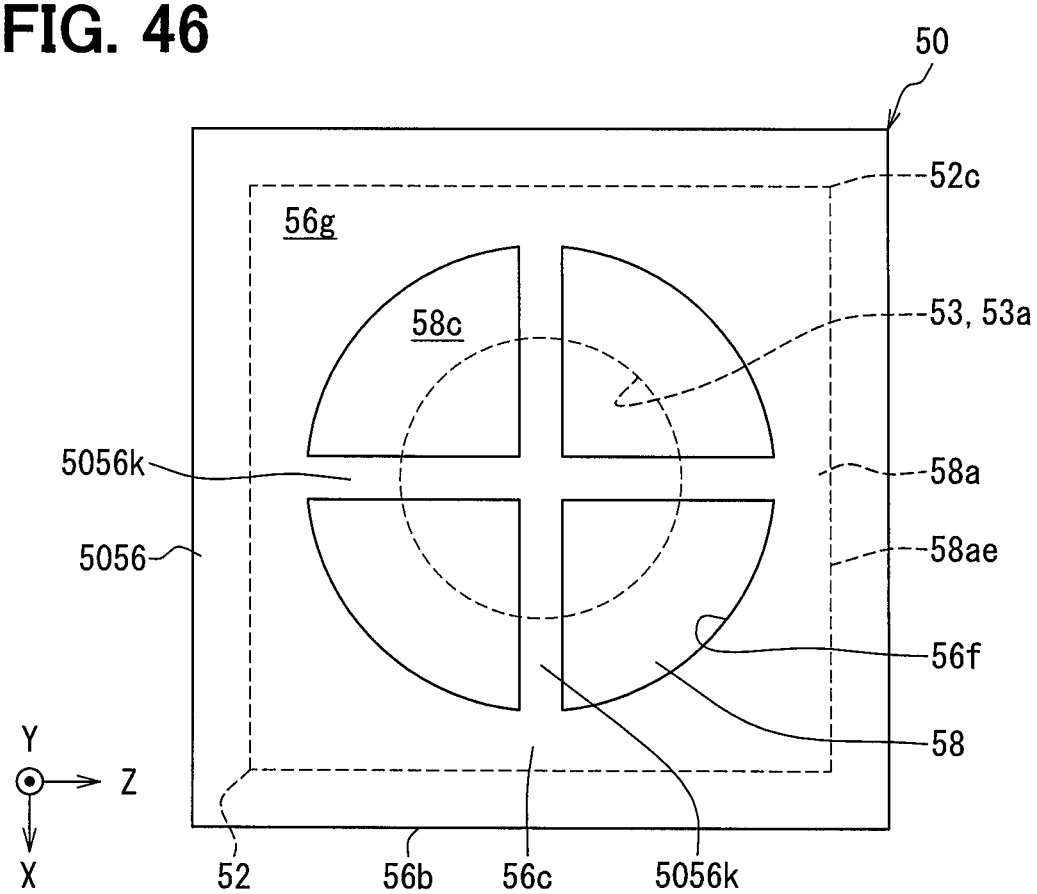
FIG. 46 is a plan view showing a modified example of FIG. 21.
Figure 47:
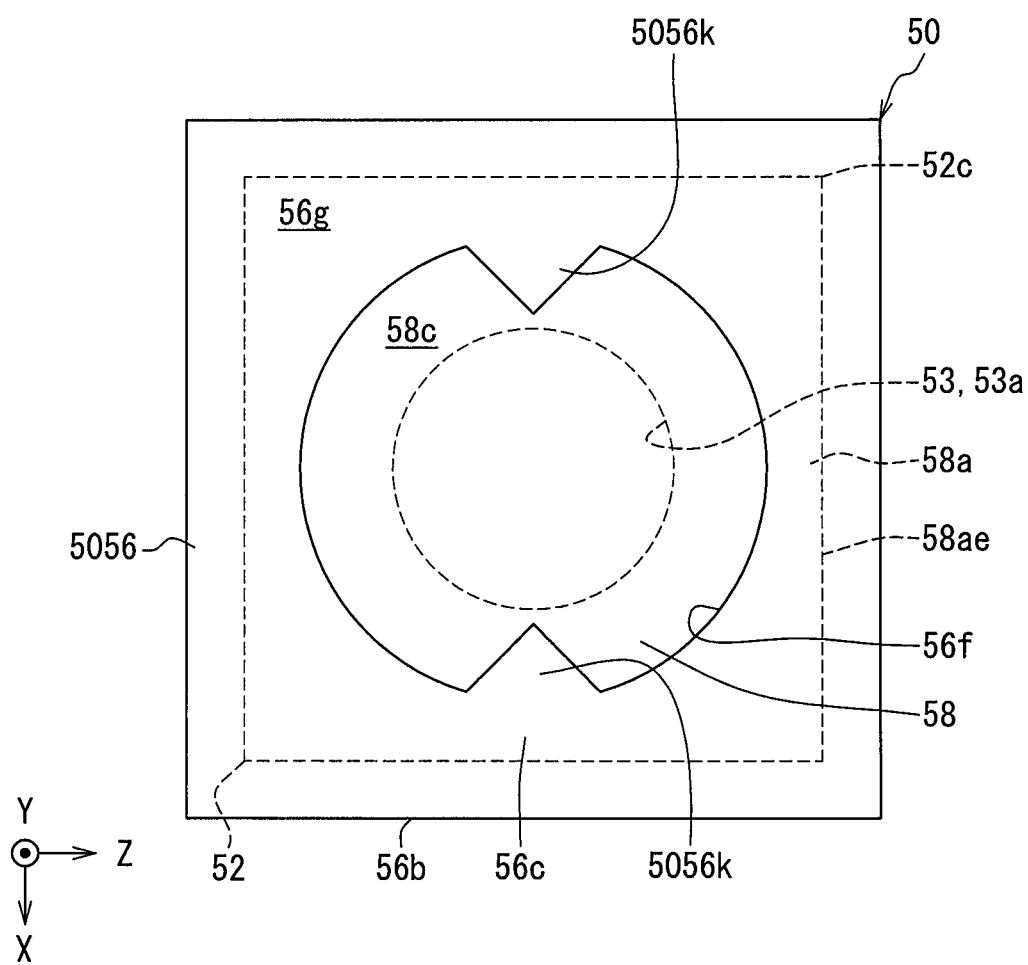
FIG. 47 is a plan view showing a modified example of FIG. 21.

The anchor portion 4056*j* of the fourth embodiment protrudes with a constant thickness, the anchor portion 4056*j* of the modification 15 related to the fourth embodiment may be made thinner toward the protruding side as shown in FIG. 45, for example. The overhanging portion 5056*k* of the modification 16 relating to the fifth embodiment is not limited to the overhanging configuration in which the two portions of the cover window 56*f* are connected, for example, the overhanging portion 5056*k* may be formed in an overhanging manner as shown in FIGS. 46 and 47. In the cover window 56*f* of the modification 15 shown in FIG. 46, an overhanging portion 5056*k* connecting two positions facing each other in the radial direction and an overhanging portion 5056*k* connecting the other positions facing each other in the radial direction protrude toward the inner peripheral side. On the other hand, in the cover window 56*f* of the modification 16 shown in FIG. 47, the overhanging portion 5056*k* protrudes from two positions opposed to each other in the radial direction to the inner peripheral side with a length not reaching the center of the circular contour.

Figure 48:
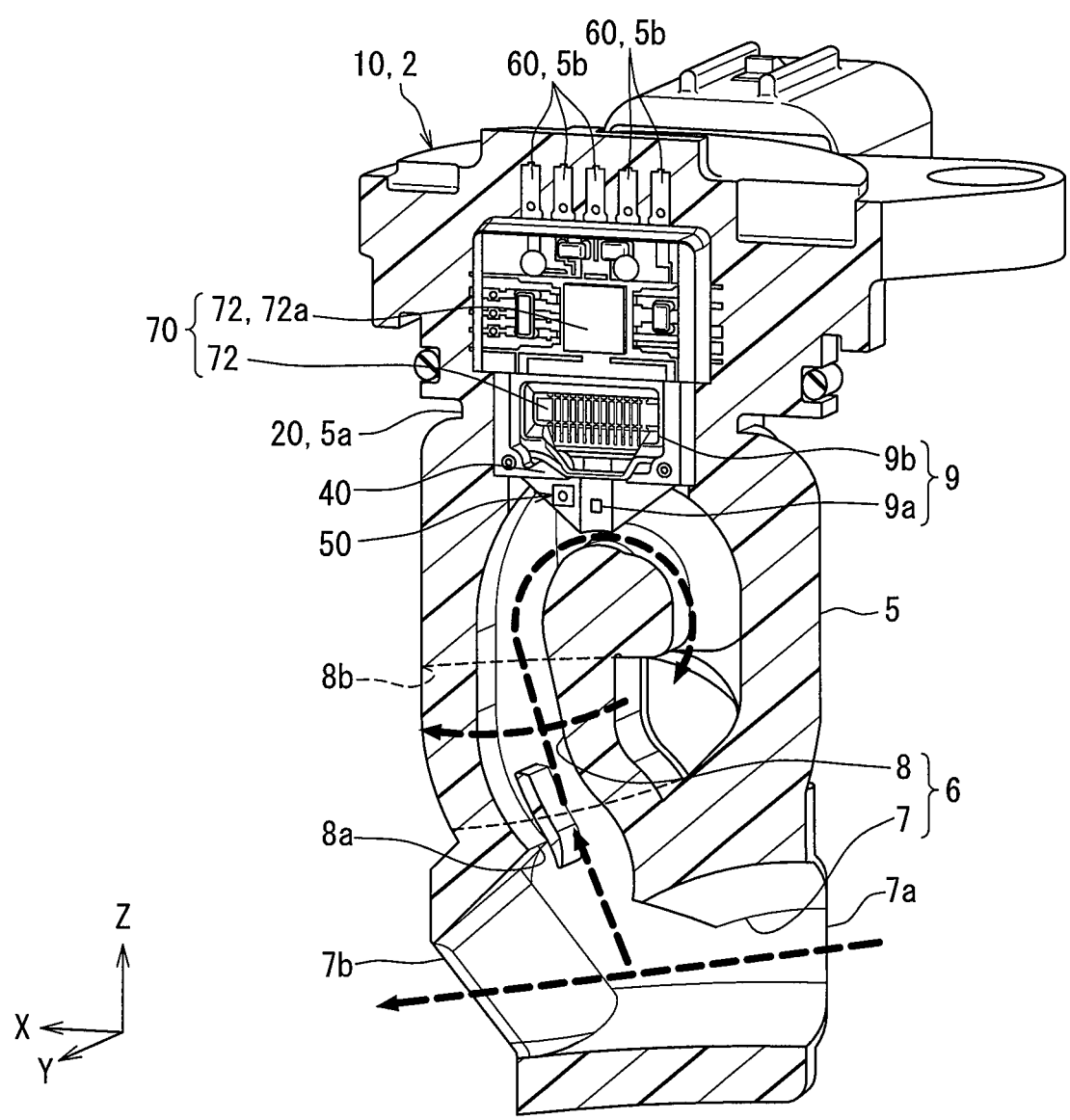
FIG. 48 is a partial cross-sectional perspective view showing a modified example of FIG. 3.

As a modification 17 relating to the first to eighth embodiments, as shown in FIG. 48, the air physical quantity sensor 10 is integrally formed with the air flow detection unit 2. The sensor unit 50 may be exposed to a second passage portion 8 of the bypass passage 6. In the modification 17 shown in FIG. 48, the sensor case 20 is shared with the detection body 5*a* of the flow detection body 5, and the terminal 60 is shared with the terminal 5*b* of the flow detection body 5. In the modification 17 shown in FIG. 48, the sensor body 50 and the circuit module 70 are mounted together with the sensor element 9*a* and the circuit module 9*b* on the sensor substrate 40. As a result, the sensor filter 58 of the sensor body 50 filters a part of the intake air flowing from the bypass passage 6 as the "flow passage" into the body recess 53 through the cover window 56*f* and the body opening 53*a*. In FIG. 48, illustration of each constituent element constituting the sensor body 50 of the embodiment to be applied is omitted.

Figure 49:
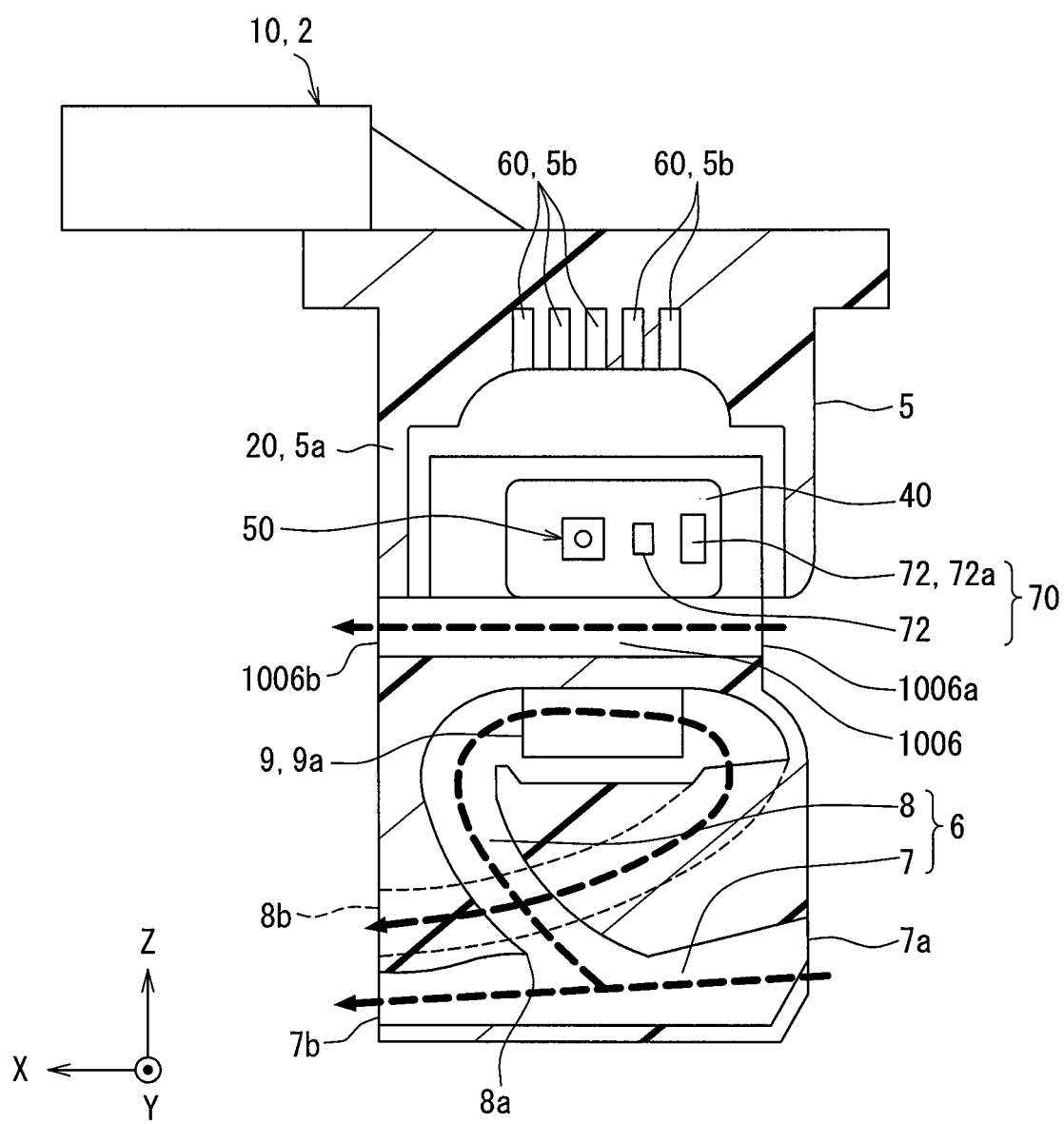
FIG. 49 is a cross-sectional view for explaining a modified example of FIG. 48.

In further modification 18 of the modification 17 relating to the first to the eighth embodiments, as shown in FIG. 49, another bypass passage 1006 is configured to separate from the bypass passage 6, and the bypass passage 1006 has an inlet 1006*a* and an outlet 1006*b*, both of which expose the intake passage 3. The bypass passage 1006 is referred to as the flow passage. The sensor unit 50 may be exposed to the bypass passage 1006. In the modification 18, a sensor substrate 40, on which the sensor element 9*a* and the circuit module 9*b* are not mounted, is applied as described in the first embodiment. In FIG. 49, illustration of each constituent element constituting the sensor body 50 of the embodiment to be applied is omitted.

Figure 50:
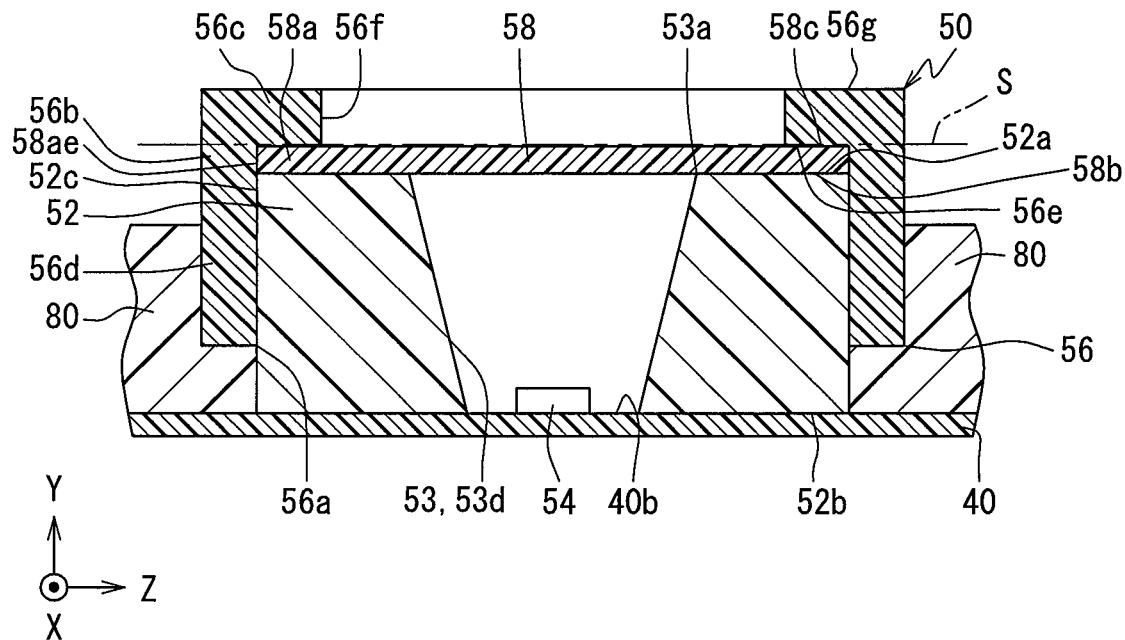
FIG. 50 is a cross-sectional view showing a modified example of FIG. 6.
Figure 51:
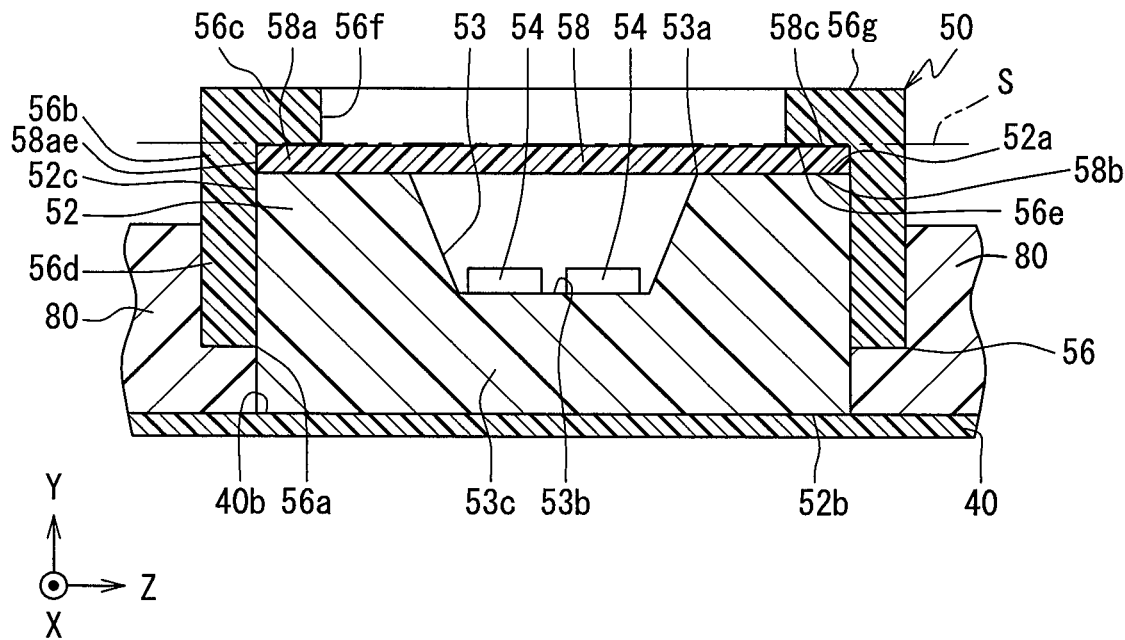
FIG. 51 is a cross-sectional view showing a modified example of FIG. 6.

In a modification 19 relating to the first to the eighth embodiments, as shown in FIG. 50, a hole portion 53*d* penetrates in Y direction through the sensor body 52, and the hole portion 53*d* is covered by the sensor substrate 40, on which the sensor element 54 is mounted. The body recess 53 may be formed as being surrounded by the hole portion 53*d* and the sensor substrate 40. In a modification 20 relating to the first to the eighth embodiments, the sensor element 54 may detect a specified physical quantity, such as temperature, pressure, thermal conductivity, density, or flow amount for air except for the air humidity. In a modification 21 relating to the first to the eighth embodiments, as shown in FIG. 51, a plurality of the sensor elements 54 which detect the different physical quantity or detect same physical quantity may be housed in the body recess 53. FIGS. 50 and 51 show respectively the modification 19, 21 relating to the first embodiment.

In our disclosure, the sensor filter is interposed between the sensor cover and the sensor body which covers the sensor cover. According to this configuration, it is possible to suppress a situation in which the sensor filter is separated from the regular position between the sensor body and the sensor cover. Furthermore, the sensor cover is embedded in the potting resin body for sealing the circuit element on the mounting surface of the sensor substrate holding the sensor body, on the outer peripheral side of the sensor body. As a result, the sensor cover can be fixed in position relative to the sensor substrate with a large embedded surface area that can be secured by hardening the potting resin body and secured on the outer peripheral side of the sensor body. It is possible to suppress a situation in which the sensor filter is separated from the regular position to the flow passage by the sensor cover fixed in position.

The invention claimed is:

1. An air physical quantity sensor configured to detect a specific physical quantity related to air flowing in a flow passage, the air physical quantity sensor comprising:
    a sensor element configured to output a detection signal in accordance with the specific physical quantity;
    a sensor body having a body recess opening at a body opening and being configured to contain the sensor element in the body recess;
    a sensor substrate having a mounting surface on which a circuit element for processing the detection signal is mounted, the sensor substrate holding the sensor body on the mounting surface;
    a sensor cover having a cover window penetrating between the flow passage and the body opening, wherein the sensor cover is configured to cover the sensor body;
    a sensor filter interposed between the sensor body and the sensor cover, wherein the sensor filter is configured to filter the air flowing from the flow passage into the body recess through the body window and the body opening; and
    a potting resin body being hardened in a state of sealing the circuit element on the mounting surface, the potting resin body in which the sensor cover is embedded on the outer peripheral side of the sensor body.

2. The air physical quantity sensor according to claim 1, wherein
    the sensor cover has a bottomed cup shape opened at a cover opening, and includes a cover bottom wall portion, and a cover peripheral wall portion surrounding the sensor body and the sensor filter from the outer peripheral side,
    the filter is held between the cover bottom wall portion and the sensor body, and
    the cover peripheral wall portion is embedded in the potting resin body from the cover opening side.

3. The air physical quantity sensor according to claim 2, wherein
    the sensor cover has an anchor portion protruding from the cover peripheral wall portion, and
    the anchor portion is embedded in the potting resin body.

4. The air physical quantity sensor according to claim 2, wherein
    the sensor cover covers the entire outer peripheral side of the sensor body with the cover peripheral wall portion.

5. The air physical quantity sensor according to claim 2, wherein
    the sensor cover has a through hole portion penetrating the cover peripheral wall portion, and
    the potting resin body is provided to extend from the through hole portion between the sensor body and the cover peripheral wall portion.

6. The air physical quantity sensor according to claim 5, wherein
    the through hole portion passes through the cover peripheral wall portion between an end portion on the cover opening side and an end portion on the cover bottom wall portion side.

7. The air physical quantity sensor according to claim 1, wherein
    the sensor cover has an overhanging portion overhanging toward an inner peripheral side of the cover window.

8. The air physical quantity sensor according to claim 1, wherein
    the sensor filter extends along a virtual plane to form a filter peripheral portion, and
    the body opening and the cover window are accommodated in a filter region on the inner peripheral side of a contour of the filter outer peripheral portion in projection view with respect to the virtual plane.

9. The air physical quantity sensor according to claim 8, wherein
    the body opening is accommodated in the cover window in the projection view.

10. The air physical quantity sensor according to claim 1, wherein
    the sensor filter is joined to at least one of the sensor body or the sensor cover.

11. The air physical quantity sensor according to claim 1, wherein
    the sensor filter filters the air flowing through an intake passage as the flow passage in an internal combustion engine.

12. An air physical quantity sensor configured to detect a specific physical quantity related to air flowing in a flow passage, the air physical quantity sensor comprising:
    a sensor element configured to output a detection signal in accordance with the specific physical quantity;
    a sensor body having a body recess opening at a body opening, wherein the sensor body is configured to contain the sensor element in the body recess;
    a sensor substrate configured to hold the sensor body;
    a sensor cover having a cover window penetrating between the flow passage and the body opening, wherein the sensor cover is configured to cover the sensor body;
    a sensor filter interposed between the sensor body and the sensor cover, wherein the sensor filter is configured to filter the air flowing from the flow passage into the body recess through the body window and the body opening; and
    a resin body in which the sensor cover is embedded on the outer peripheral side of the sensor body.

* * * * *